(12) United States Patent
Livanec et al.

(10) Patent No.: US 10,000,681 B2
(45) Date of Patent: Jun. 19, 2018

(54) HOLLOW HYDROGEL CAPSULES AND METHODS OF USING THE SAME

(71) Applicant: Halliburton Energy Services, Inc., Houston, TX (US)

(72) Inventors: Philip Wayne Livanec, Deer Park, TX (US); Scott Anthony Klasner, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 555 days.

(21) Appl. No.: 13/725,421

(22) Filed: Dec. 21, 2012

(65) Prior Publication Data

US 2014/0174724 A1 Jun. 26, 2014

(51) Int. Cl.

| | |
|---|---|
| E21B 43/25 | (2006.01) |
| C09K 8/03 | (2006.01) |
| C09K 8/60 | (2006.01) |
| E21B 33/13 | (2006.01) |
| E21B 43/16 | (2006.01) |
| C09K 8/536 | (2006.01) |
| C09K 8/92 | (2006.01) |

(52) U.S. Cl.
CPC .............. *C09K 8/03* (2013.01); *C09K 8/536* (2013.01); *C09K 8/60* (2013.01); *C09K 8/92* (2013.01); *E21B 33/13* (2013.01); *E21B 43/16* (2013.01)

(58) Field of Classification Search
CPC ...................................................... E21B 43/25
See application file for complete search history.

(56) References Cited

U.S. PATENT DOCUMENTS

| | | | | |
|---|---|---|---|---|
| 3,952,741 A | * | 4/1976 | Baker | A61K 9/0004 222/491 |
| 5,373,901 A | * | 12/1994 | Norman | C09K 8/706 166/300 |
| 6,357,527 B1 | | 3/2002 | Norman et al. | |
| 7,156,174 B2 | | 1/2007 | Roddy et al. | |
| 7,204,312 B2 | | 4/2007 | Roddy et al. | |
| 7,304,098 B2 | | 12/2007 | Li et al. | |
| 8,273,426 B1 | | 9/2012 | Laramay et al. | |
| 2003/0008779 A1 | * | 1/2003 | Chen | A61K 8/8158 507/200 |
| 2004/0014607 A1 | | 1/2004 | Sinclair et al. | |
| 2005/0167104 A1 | | 8/2005 | Roddy et al. | |
| 2005/0250652 A1 | * | 11/2005 | Taylor | C09K 8/64 507/203 |
| 2009/0289216 A1 | * | 11/2009 | Jung | B01J 13/14 252/79 |
| 2011/0269904 A1 | * | 11/2011 | Bismarck | C08F 4/40 524/607 |
| 2012/0067577 A1 | | 3/2012 | Roddy | |

FOREIGN PATENT DOCUMENTS

| | | |
|---|---|---|
| CN | 1786101 A | 6/2006 |
| WO | WO-2004001188 A1 | 12/2003 |
| WO | WO-2009078745 A1 | 6/2009 |
| WO | WO-2010020351 A1 | 2/2010 |
| WO | WO-2011023934 A2 | 3/2011 |
| WO | WO-2014/099650 A2 | 6/2014 |
| WO | WO-2014099650 A3 | 6/2014 |

OTHER PUBLICATIONS

Esser-Kahn et al. Triggered Release from Polymer Capsules Jul. 6, 2011.*
Kim, Junoh, et al., "Template-Free Uniform-Sized Hollow Hydrogel Capsules with Controlled Shell Permeation and Optical Responsiveness", Langmuir, vol. 28, (2012), 11899-11905.
Kim, Junoh, et al., "Template-Free Uniform-Sized Hollow Hydrogel Capsules with Controlled Shell Permeation and Optical Responsiveness", Supporting Information, 8 pgs.
"International Application Serial No. PCT/US2013/074946, International Preliminary Report on Patentability dated Jul. 2, 2015", 7 pgs.
"International Application Serial No. PCT/US2013/074946, International Search Report dated Sep. 24, 2014", 3 pgs.
"International Application Serial No. PCT/US2013/074946, Written Opinion dated Sep. 24, 2014", 5 pgs.
Han, Joo-Hyun, et al., "A facile approach to synthesize uniform hydrogel shells with controllable loading and releasing properties", *Chem. Commun.*, (2008), 984-986.
Kozlovskaya, Veronika, et al., "pH-Responsive Layered Hydrogel Microcapsules as Gold Nanoreactors", *Chemistry of Materials*, 21(10), (2009), 2158-2167.
"Australian Application Serial No. 2013363284, Examination Report dated Jul. 1, 2015", 2 pgs.
"European Application Serial No. 13864156.8, Office Action dated Jun. 26, 2015", 2 pgs.
"European Application Serial No. 13864156.8, Response filed Nov. 17, 2015 to Office Action dated Jun. 26, 2015", 10 pgs.

(Continued)

*Primary Examiner* — Angela M DiTrani
*Assistant Examiner* — Avi T Skaist
(74) *Attorney, Agent, or Firm* — Tenley Krueger; Tumey L.L.P.

(57) ABSTRACT

The present invention relates to hollow hydrogel capsules. In various embodiments, the present invention provides a method of treating a subterranean formation with a hollow hydrogel capsule including a hydrogel shell including a hydrolyzed and crosslinked polymerized composition. The hollow hydrogel capsule also includes a hollow interior including at least one component of a downhole composition for subterranean petroleum or water well drilling, stimulation, clean-up, production, completion, abandonment, or a combination thereof. In various embodiments, the present invention provides compositions comprising the hollow hydrogel capsules and methods of making the hollow hydrogel capsules.

8 Claims, 10 Drawing Sheets

(56) References Cited

OTHER PUBLICATIONS

"Australian Application Serial No. 2013363284, Response filed May 19, 2016 to Examination Report dated Jul. 1, 2015", 25 pgs.
"European Application Serial No. 13864156.8, Extended European Search Report dated Jun. 14, 2016", 6 pgs.
"Canadian Application Serial No. 2,892,055, Office Action dated Jun. 1, 2016", 3 pgs.
"Singapore Application Serial No. 11201503535P, Written Opinion dated Feb. 29, 2016", 6 pgs.

* cited by examiner

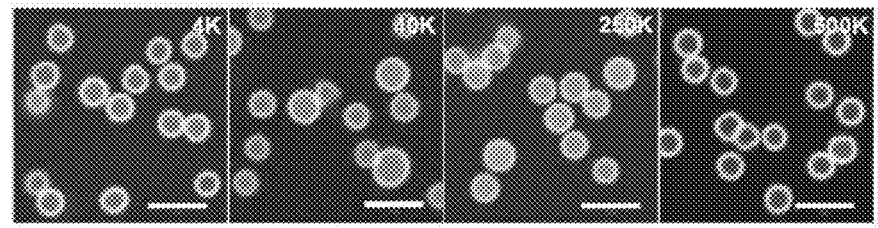
*FIG. 5A*
(PRIOR ART)
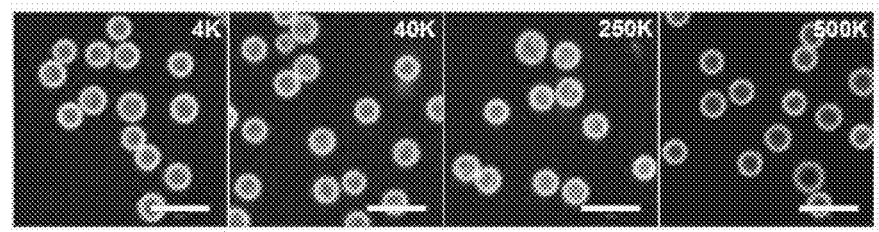
*FIG. 5B*
(PRIOR ART)
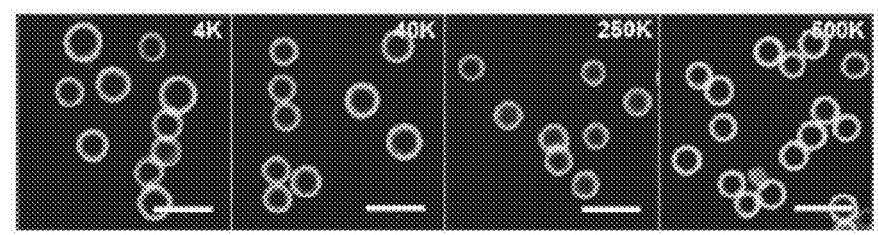
*FIG. 6*
(PRIOR ART)
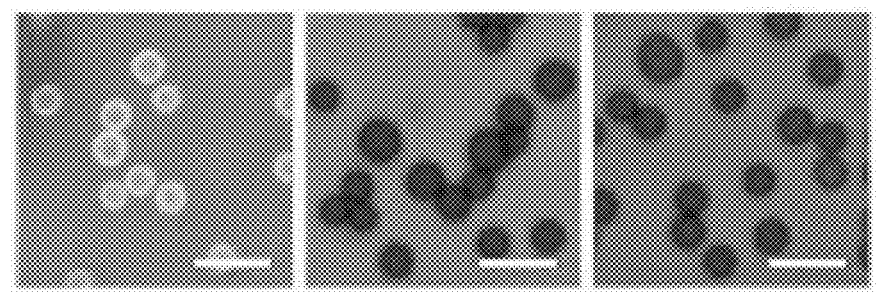
*FIG. 7A*
(PRIOR ART)
*FIG. 7B*
(PRIOR ART)
*FIG. 7C*
(PRIOR ART)

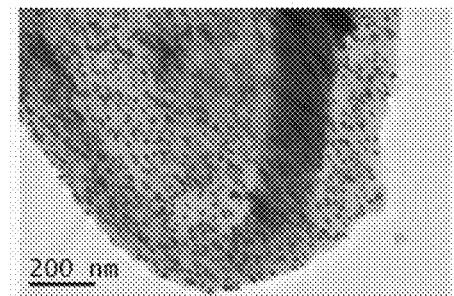
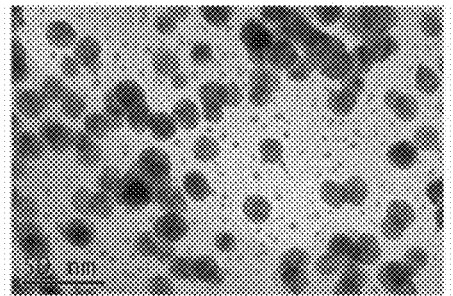
*FIG. 9A*
(PRIOR ART)
*FIG. 9B*
(PRIOR ART)
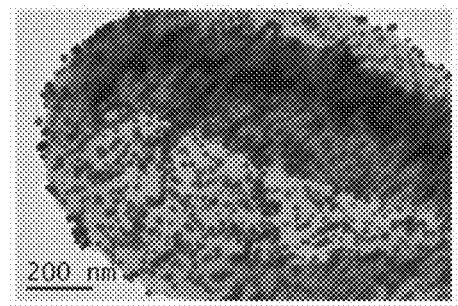
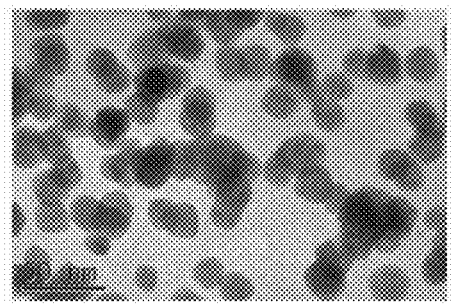
*FIG. 9C*
(PRIOR ART)
*FIG. 9D*
(PRIOR ART)
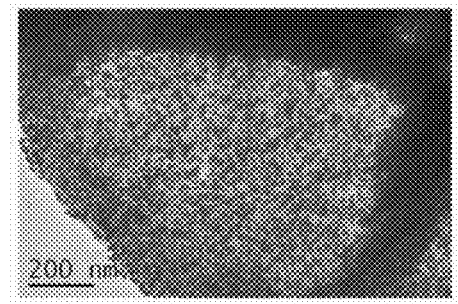
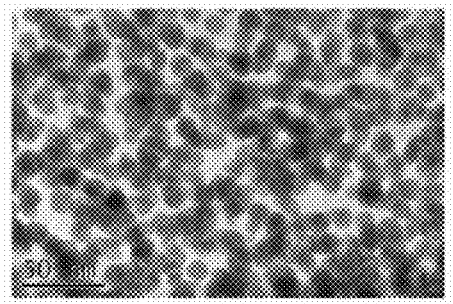
*FIG. 9E*
(PRIOR ART)
*FIG. 9F*
(PRIOR ART)

HOLLOW HYDROGEL CAPSULES AND METHODS OF USING THE SAME

BACKGROUND OF THE INVENTION

During the drilling, completion, and production phases of wells for petroleum or water extraction, the use of precise chemical compositions downhole is important for a wide variety of purposes. Current techniques expose all chemical components of a composition for use downhole to the borehole and other materials downhole en route to a desired location without the ability to control or modulate the concentration or reactivity of the chemical component on its way to a target location.

SUMMARY OF THE INVENTION

In various embodiments, the present invention provides a hollow hydrogel capsule for treatment of a subterranean formation. The hollow hydrogel capsule includes a hydrogel shell. The hydrogel shell includes a polymerized composition that is hydrolyzed and crosslinked. The pre-polymerized composition includes at least one vinyl amine. The vinyl amine includes at least one hydrolytically deprotectable masked primary amine. The pre-polymerized composition also includes at least one polyvinyl compound. The hydrogel capsule also includes a hollow interior. The hollow interior includes at least one component of a composition for use downhole. The downhole composition is for subterranean petroleum or water well drilling, stimulation, clean-up, production, completion, abandonment, or a combination thereof. The crosslinking of the hydrolyzed and crosslinked polymerized composition includes crosslinking with at least one molecule including a plurality of functional groups condensable with primary amines.

In various embodiments, the present invention provides a hydrogel capsule composition for treatment of a subterranean formation. The hydrogel capsule composition includes at least one of the hollow hydrogel capsules having at least one component of a composition for use downhole therein. The hydrogel capsule composition also includes a downhole composition for subterranean petroleum or water well drilling, stimulation, clean-up, production, completion, abandonment, or a combination thereof.

In various embodiments, the present invention provides a method of making the hollow hydrogel capsule having at least one component of a composition for use downhole therein. The method includes polymerizing the pre-polymerized composition including the at least one vinyl amine including the hydrolytically deprotectable masked primary amine, and the at least one polyvinyl compound. The polymerizing gives a first polymer. The method also includes hydrolyzing the first polymer, to deprotect at least some of the masked primary amine. The hydrolyzing gives a second polymer. The method also includes cross-linking the second polymer with the at least one molecule including the plurality of functional groups condensable with primary amines. The crosslinking give the hydrogel shell including the hydrolyzed and crosslinked polymerized composition.

In various embodiments, the present invention provides a method of using a hydrogel capsule for treatment of a subterranean formation. The method includes obtaining or providing one or more of the hollow hydrogel capsules having at least one component of a composition for use downhole therein. The method also includes contacting the hollow hydrogel capsules with a subterranean material downhole.

Various embodiments of the present invention provide certain advantages over other hydrogel capsules, compositions including the same, methods of making the same, and methods of using the same, at least some of which are unexpected. Various embodiments can advantageously allow high degrees of control over the rate, time, and location of delivery of certain cargo within the hollow interior of the capsule. For example, in certain embodiments, the hydrogel capsules of the present invention can selectively release a cargo over a broad or narrow area downhole, advantageously allowing targeting delivery of particular cargo. In various embodiments, the permeability of the hydrogel capsule can be adjusted above ground or downhole to allow the delivery of a cargo at a desired location or at a desired rate. In some examples, conditions downhole, such as the chemical environment, temperature conditions, pressure conditions, or vibration/agitation conditions, can be used to trigger the release of cargo from the hydrogel capsules. In some embodiments, the chemical composition of the hydrogel capsule can be adjusted to yield a desired release profile or a desired triggering mechanism. In some examples, the hydrogel capsules can release cargo at a precise time or location in a wellbore, such as due to external environmental stimulus such as conditions downhole, due to time delay, or due to triggering mechanisms that can be controlled from the surface such as laser light or agitation.

BRIEF DESCRIPTION OF THE FIGURES

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIGS. 5a-b illustrate permeation of FITC-labeled dextran through the shell phases crosslinked with (a) 0.015 mol GA and (b) 0.1 mol GA, in accordance with various embodiments.

FIG. 6 illustrates permeation of FITC-labeled dextran through the hydrogel shell phases cross-linked with GA followed by the posttreatment with HA, with the numbers in the images denoting the average molecular weight of FITC-labeled dextran, in accordance with various embodiments.

FIG. 7a-c illustrate permeability of a low molecular weight anionic dye through a hydrogel shell phase treated with HA, in accordance with various embodiments: (a) 0.05 mol GA without HA treatment 5 mM after incubation, (b) 0.015 mol GA followed by the treatment with 250 kDa HA, and (c) 0.015 mol GA followed by the treatment with 1.45 MDa HA 60 mM after incubation.

FIGS. 9a-f illustrate incorporation of Au NPs within the hydrogel shell phases, synthesized using different concentrations of $HAuCl_4$ solution, in accordance with various embodiments: (a, b) 2 mM; (c, d) 10 mM; (e, f) 50 mM, wherein (b), (d), and (f) show the high magnification for those of (a), (c), and (e), respectively.

DETAILED DESCRIPTION OF THE INVENTION

Figure 1A:
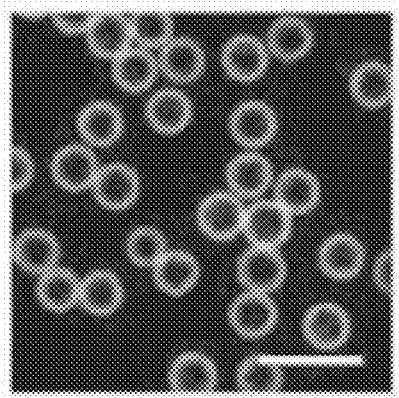
FIG. 1a illustrates a CLSM image of hollow PVAm hydrogel capsules after in situ hydrolysis and cross-linking, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described herein, the steps can be carried out in any order without departing from the principles of the invention, except when a temporal or operational sequence is explicitly recited.

Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

Definitions

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule, or onto an organic group. Examples of substituents or functional groups include, but are not limited to, a halogen (e.g., F, Cl, Br, and I); an oxygen atom in groups such as hydroxyl groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxylamines, nitriles, nitro groups, N-oxides, hydrazides, azides, and enamines; and other heteroatoms in various other groups. Non-limiting examples of substituents J that can be bonded to a substituted carbon (or other) atom include F, Cl, Br, I, OR', OC(O)N(R')$_2$, CN, NO, NO$_2$, ONO$_2$, azido, CF$_3$, OCF$_3$, R', O (oxo), S (thiono), C(O), S(O), methylenedioxy, ethylenedioxy, N(R')$_2$, SR', SOR', SO$_2$R', SO$_2$N(R')$_2$, SO$_3$R', C(O)R', C(O)C(O)R', C(O)CH$_2$C(O)R', C(S)R', C(O)OR', OC(O)R', C(O)N(R')$_2$, OC(O)N(R')$_2$, C(S)N(R')$_2$, (CH$_2$)$_{0-2}$N(R')C(O)R', (CH$_2$)$_{0-2}$N(R')N(R')$_2$, N(R')N(R')C(O)R', N(R')N(R')C(O)OR', N(R')N(R')CON(R')$_2$, N(R')SO$_2$R', N(R')SO$_2$N(R')$_2$, N(R')C(O)OR', N(R')C(O)R', N(R')C(S)R', N(R')C(O)N(R')$_2$, N(R')C(S)N(R')$_2$, N(COR')COR', N(OR')R', C(=NH)N(R$^1$)$_2$, C(O)N(OR')R', or C(=NOR')R' wherein R' can be hydrogen or a carbon-based moiety, and wherein the carbon-based moiety can itself be further substituted; for example, wherein R' can be hydrogen, alkyl, acyl, cycloalkyl, aryl, aralkyl, heterocyclyl, heteroaryl, or heteroarylalkyl, wherein any alkyl, acyl, cycloalkyl, aryl, aralkyl, heterocyclyl, heteroaryl, or heteroarylalkyl or R' can be independently mono- or multi-substituted with J; or wherein two R' groups bonded to a nitrogen atom or to adjacent nitrogen atoms can together with the nitrogen atom or atoms form a heterocyclyl, which can be mono- or independently multi-substituted with J.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "alkynyl" as used herein refers to straight and branched chain alkyl groups, except that at least one triple bond exists between two carbon atoms. Thus, alkynyl groups have from 2 to 40 carbon atoms, 2 to about 20 carbon atoms, or from 2 to 12 carbons or, in some embodiments, from 2 to 8 carbon atoms. Examples include, but are not limited to —C≡CH, —C≡C(CH$_3$), —C≡C(CH$_2$CH$_3$), —CH$_2$C≡CH, —CH$_2$C≡C(CH$_3$), and —CH$_2$C≡C(CH$_2$CH$_3$) among others.

The term "acyl" as used herein refers to a group containing a carbonyl moiety wherein the group is bonded via the carbonyl carbon atom. The carbonyl carbon atom is also bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. In the special case wherein the carbonyl carbon atom is bonded to a hydrogen, the group is a "formyl" group, an acyl group as the term is defined herein. An acyl group can include 0 to about 12-20 or 12-40 additional carbon atoms bonded to the carbonyl group. An acyl group can include double or triple bonds within the meaning herein. An acryloyl group is an example of an acyl group. An acyl group can also include heteroatoms within the meaning here. A nicotinoyl group (pyridyl-3-carbonyl) group is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "cycloalkyl" as used herein refers to cyclic alkyl groups such as, but not limited to, cyclopropyl, cyclobutyl, cyclopentyl, cyclohexyl, cycloheptyl, and cyclooctyl groups. In some embodiments, the cyclo alkyl group can have 3 to about 8-12 ring members, whereas in other embodiments the number of ring carbon atoms range from 3 to 4, 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined herein. Representative substituted cycloalkyl groups can be mono-substituted or substituted more than once, such as, but not limited to, 2,2-, 2,3-, 2,4- 2,5- or 2,6-disubstituted cyclohexyl groups or mono-, di- or tri-substituted norbornyl or cycloheptyl groups, which can be substituted with, for example, amino, hydroxy, cyano, carboxy, nitro, thio, alkoxy, and halogen groups. The term "cycloalkenyl" alone or in combination denotes a cyclic alkenyl group.

The term "aryl" as used herein refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

The term "aralkyl" as used herein refers to alkyl groups as defined herein in which a hydrogen or carbon bond of an alkyl group is replaced with a bond to an aryl group as defined herein. Representative aralkyl groups include benzyl and phenylethyl groups and fused (cycloalkylaryl)alkyl groups such as 4-ethyl-indanyl. Aralkenyl group are alkenyl groups as defined herein in which a hydrogen or carbon bond of an alkyl group is replaced with a bond to an aryl group as defined herein.

The term "heterocyclyl" as used herein refers to aromatic and non-aromatic ring compounds containing 3 or more ring members, of which, one or more is a heteroatom such as, but not limited to, N, O, and S. Thus a heterocyclyl can be a cycloheteroalkyl, or a heteroaryl, or if polycyclic, any combination thereof. In some embodiments, heterocyclyl groups include 3 to about 20 ring members, whereas other such groups have 3 to about 15 ring members. A heterocyclyl group designated as a C$_2$-heterocyclyl can be a 5-ring with two carbon atoms and three heteroatoms, a 6-ring with two carbon atoms and four heteroatoms and so forth. Likewise a C$_4$-heterocyclyl can be a 5-ring with one heteroatom, a 6-ring with two heteroatoms, and so forth. The number of carbon atoms plus the number of heteroatoms sums up to equal the total number of ring atoms. A heterocyclyl ring can also include one or more double bonds. A heteroaryl ring is an embodiment of a heterocyclyl group. The phrase "heterocyclyl group" includes fused ring species including those that include fused aromatic and non-aromatic groups.

The term "heterocyclylalkyl" as used herein refers to alkyl groups as defined herein in which a hydrogen or carbon bond of an alkyl group as defined herein is replaced with a bond to a heterocyclyl group as defined herein. Representative heterocyclyl alkyl groups include, but are not limited to, furan-2-yl methyl, furan-3-yl methyl, pyridine-3-yl methyl, tetrahydrofuran-2-yl ethyl, and indol-2-yl propyl.

The term "heteroarylalkyl" as used herein refers to alkyl groups as defined herein in which a hydrogen or carbon bond of an alkyl group is replaced with a bond to a heteroaryl group as defined herein.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include one to about 12-20 or about 12-40 carbon atoms bonded to the oxygen atom, and can further include double or triple bonds, and can also include heteroatoms. For example, an allyloxy group is an alkoxy group within the meaning herein. A methoxyethoxy group is also an alkoxy group within the meaning herein, as is a methylenedioxy group in a context where two adjacent atoms of a structures are substituted therewith.

The term "amine" as used herein refers to primary, secondary, and tertiary amines having, e.g., the formula $N(group)_3$ wherein each group can independently be H or non-H, such as alkyl, aryl, and the like. Amines include but are not limited to $R-NH_2$, for example, alkylamines, arylamines, alkylarylamines; $R_2NH$ wherein each R is independently selected, such as dialkylamines, diarylamines, aralkylamines, heterocyclylamines and the like; and $R_3N$ wherein each R is independently selected, such as trialkylamines, dialkylarylamines, alkyldiarylamines, triarylamines, and the like. The term "amine" also includes ammonium ions as used herein.

The term "amino group" as used herein refers to a substituent of the form $-NH_2$, $-NHR$, $-NR_2$, $-NR_3^+$, wherein each R is independently selected, and protonated forms of each, except for $-NR_3^+$, which cannot be protonated. Accordingly, any compound substituted with an amino group can be viewed as an amine. An "amino group" within the meaning herein can be a primary, secondary, tertiary or quaternary amino group. An "alkylamino" group includes a monoalkylamino, dialkylamino, and trialkylamino group.

The terms "halo" or "halogen" or "halide", as used herein, by themselves or as part of another substituent mean, unless otherwise stated, a fluorine, chlorine, bromine, or iodine atom, preferably, fluorine, chlorine, or bromine.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" as used herein refers to a functional group or molecule that includes carbon and hydrogen atoms. The term can also refer to a functional group or molecule that normally includes both carbon and hydrogen atoms but wherein all the hydrogen atoms are substituted with other functional groups.

The term "solvent" as used herein refers to a liquid that can dissolve a solid, liquid, or gas. Nonlimiting examples of solvents are silicones, organic compounds, water, alcohols, ionic liquids, and supercritical fluids.

The term "room temperature" as used herein refers to a temperature of about 15° C. to 28° C.

As used herein, "degree of polymerization" is the number of repeating units in a polymer.

As used herein, the term "polymer" refers to a molecule having at least one repeating unit.

The term "copolymer" as used herein refers to a polymer that includes at least two different monomers. A copolymer can include any suitable number of monomers.

The term "downhole" as used herein refers to under the surface of the earth, such as a location within or fluidly connected to a wellbore.

As used herein, the term "drilling fluid" refers to fluids, slurries, or muds used in drilling operations downhole, such as the formation of the wellbore.

As used herein, the term "stimulation fluid" refers to fluids or slurries used downhole during stimulation activities of the well that can increase the production of a well, including perforation activities. In some examples, a stimulation fluid can include a fracking fluid, or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracking fluid" refers to fluids or slurries used downhole during fracking operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "production fluid" refers to fluids or slurries used downhole during the production phase of a well. Production fluids can include downhole treatments designed to maintain or increase the production rate of a well, such as perforation treatments, clean-up treatments, or remedial treatments.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments downhole. In one example, an acidizing fluid is used in a clean-up operation to remove material obstructing the flow of desired material, such as material formed during a perforation operation. In some examples, an acidizing fluid can be used for damage removal.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "subterranean material" or "subterranean formation" refers to any material under the surface of the earth, including under the surface of the bottom of the ocean. For example, a subterranean material can be any section of a wellbore, including any materials placed into the wellbore such as cement, drill shafts, liners, or screens. In some examples, a subterranean material can be any section of underground that can produce liquid or gaseous petroleum materials or water.

As used herein, the term "hydrocarbyl" refers to a functional group derived from a straight chain, branched, or cyclic hydrocarbon, such as an alkyl, alkenyl, alkynyl, aryl, cycloalkyl, acyl, or a combination thereof.

As used herein, the term "radiation" refers to energetic particles travelling through a medium or space. Examples of radiation include visible light, infrared light, microwaves, radio waves, very low frequency waves, extremely low frequency waves, thermal radiation (heat), and black-body radiation.

As used herein, the term "condensation" with respect to a chemical reaction refers to a chemical reaction wherein two molecules combine with the loss of a small molecule such as water, hydrogen chloride, methanol, acetic acid, or any suitable product of the combination.

Method of Using the Hollow Hydrogel Capsule for Treatment of a Subterranean Formation.

In various embodiments, the present invention provides a method of using a hydrogel capsule. The method includes obtaining or providing one or more hollow hydrogel capsules. The hollow hydrogel capsule includes a hydrogel shell. The hydrogel shell includes a polymerized composition that is hydrolyzed and crosslinked. The pre-polymerized composition includes at least one vinyl amine. The vinyl amine includes at least one hydrolytically deprotectable masked primary amine. The pre-polymerized composition also includes at least one polyvinyl compound. The hydrogel capsule also includes a hollow interior. The hollow interior includes at least one component of a composition for use downhole. The downhole composition is for subterranean petroleum or water well drilling, stimulation, clean-up, production, completion, abandonment, or a combination thereof. The crosslinking of the hydrolyzed and crosslinked polymerized composition includes crosslinking with at least one molecule including a plurality of functional groups condensable with primary amines. The method also includes contacting the hollow hydrogel capsules with a subterranean material downhole. The method can include releasing downhole at least some or substantially all of the at least one component of the downhole composition in the hollow interior of the capsule. The releasing can be localized to one or more specific regions downhole.

In some embodiments, the method includes providing the hollow hydrogel capsules in a composition that includes that hollow hydrogel capsules. Likewise, the contacting of the hollow hydrogel capsules with the subterranean material downhole can be contacting the composition that includes the capsules with the subterranean material downhole. The composition that includes the hydrogel capsules can be any suitable composition that includes that hydrogel capsules. For example, the composition that includes the hydrogel capsules can be a downhole composition for subterranean petroleum or water well drilling, stimulation, clean-up, production, completion, abandonment, or a combination thereof. The downhole composition for subterranean petroleum or water well drilling, stimulation, clean-up, production, completion, abandonment, or a combination thereof can include at least one of a drilling fluid, stimulation fluid, fracking fluid, spotting fluid, clean-up fluid, production fluid, completion fluid, remedial treatment fluid, abandonment fluid, pill, acidizing fluid, and a cementing fluid.

The method can include triggering the release of at least some of the at least one component of the downhole composition in the hollow interior of at least some of the hollow hydrogel capsules. The triggering can occur downhole, or above ground. The triggering can include at least one of acid-triggered, caustic material-triggered, heat-triggered, light-triggered, radiation-triggered, chemically-triggered, natural decay of materials within the capsule or of the capsule themselves, and vibration, acoustic, or agitation-triggered. The triggering can include triggering a gradual release of at least some of the at least one component of the downhole composition in the hollow interior of at least some of the hollow hydrogel capsules. The triggering can include triggering a fast release of substantially all of the at least one component of the downhole composition in the hollow interior of at least some of the hollow hydrogel capsules. The triggering can include an acid of caustic material reacting with the hydrogel capsule walls thereby increasing the permeability thereof, wherein the acid or caustic material is at least one of within and outside of the hollow hydrogel capsule.

The triggering can include heating the hydrogel capsule. The heating of the hydrogel capsule can occur within the capsule, at least one of in and on the hydrogel shell of the capsule, outside the hydrogel shell of the capsule, or a combination thereof. In some embodiments, the heating occurs within the capsule due at least in part to a chemical reaction of materials therein. In some embodiments, the heating is at least in part caused by heating of metal nanoparticles, wherein the metal nanoparticles are at least one of in or on the hydrogel shell of the capsule.

The triggering can include applying radiation to the hydrogel capsule. The radiation can be light, such as any suitable light. The light can be laser light. The radiation can cause heating of metal nanoparticles, wherein the metal nanoparticles are at least one of on and in the hydrogel shell of the capsule.

The triggering can be a chemical reaction that increases the permeability of the hydrogel shell, wherein the chemical reaction occurs at least one of within the capsule and outside of the capsule. The chemical reaction can produce at least one of heat and a material that reacts with the hydrogel shell thereby increasing the permeability of the hydrogel shell. The triggering can be vibrating or agitating the hydrogel capsules thereby increasing the permeability thereof. The vibrating or agitating can puncture or tear the hydrogel shells.

In some embodiments, the method of using the hydrogel capsules is a method of at least one of reducing viscosity downhole of a composition and increasing dispersion downhole of one medium in another medium. In such a method, the hydrogel capsules can include a cargo that is a component of a composition including at least one of a drilling fluid, stimulation fluid, fracking fluid, spotting fluid, clean-up fluid, production fluid, completion fluid, remedial treatment fluid, abandonment fluid, pill, acidizing fluid, and a cementing fluid. In addition, the at least one component of the downhole composition in the hollow interior of the one or more hollow hydrogel capsules can be at least one of a breaker, a surfactant, a dispersant, and a diluent.

In some embodiments, the method of using the hydrogel capsules is a method of increasing viscosity downhole of a drilling fluid, stimulation fluid, fracking fluid, spotting fluid, clean-up fluid, production fluid, completion fluid, remedial treatment fluid, abandonment fluid, pill, acidizing fluid, cementing fluid, or a combination thereof. In such a method, the hydrogel capsules can be a component of a composition including at least one of a drilling fluid, stimulation fluid, fracking fluid, spotting fluid, clean-up fluid, production fluid, completion fluid, remedial treatment fluid, abandonment fluid, pill, acidizing fluid, and a cementing fluid. In addition, the at least one component of the downhole composition in the hollow interior of the one or more hollow hydrogel capsules can be a crosslinker.

In some embodiments, the method of using the hydrogel capsules is a method of forming a cement downhole having increased porosity or of modifying the density downhole of a drilling fluid, stimulation fluid, fracking fluid, spotting fluid, clean-up fluid, production fluid, completion fluid, remedial treatment fluid, abandonment fluid, pill, acidizing fluid, cementing fluid, or a combination thereof. In such a method, the hydrogel capsules can be a component of a composition including at least one of a drilling fluid, stimulation fluid, fracking fluid, spotting fluid, clean-up fluid, production fluid, completion fluid, remedial treatment fluid, abandonment fluid, pill, acidizing fluid, cementing fluid, and a combination thereof. In addition, the at least one component of the downhole composition in the hollow interior of the one or more hollow hydrogel capsules can be a gas.

In some embodiments, the method of using the hydrogel capsules is a method of modifying viscosity downhole of a drilling fluid, stimulation fluid, fracking fluid, spotting fluid, clean-up fluid, production fluid, completion fluid, remedial treatment fluid, abandonment fluid, pill, acidizing fluid, cementing fluid, or a combination thereof. In such a method, the hydrogel capsules can be a component of a composition including at least one of a drilling fluid, stimulation fluid, fracking fluid, spotting fluid, clean-up fluid, production fluid, completion fluid, remedial treatment fluid, abandonment fluid, pill, acidizing fluid, and cementing fluid. In addition, the at least one component of the downhole composition in the hollow interior of the one or more hollow hydrogel capsules can include be viscosity modifier.

In some embodiments, the method of using the hydrogel capsules is a method of modifying density downhole of a drilling fluid, stimulation fluid, fracking fluid, spotting fluid, clean-up fluid, production fluid, completion fluid, remedial treatment fluid, abandonment fluid, pill, acidizing fluid, cementing fluid, or a combination thereof. In such a method, the hydrogel capsules can be a component of a composition including at least one of a drilling fluid, stimulation fluid, fracking fluid, spotting fluid, clean-up fluid, production fluid, completion fluid, remedial treatment fluid, abandonment fluid, pill, acidizing fluid, and a cementing fluid. In addition, the at least one component of the downhole composition in the hollow interior of the one or more hollow hydrogel capsules can be a density control agent.

In some embodiments, the method of using the hydrogel capsules is a method of adding pigment, dye, or marker downhole to a drilling fluid, stimulation fluid, fracking fluid, spotting fluid, clean-up fluid, production fluid, completion fluid, remedial treatment fluid, abandonment fluid, pill, acidizing fluid, cementing fluid, or a combination thereof. In such a method, the hydrogel capsules can be a component of a composition including at least one of a drilling fluid, stimulation fluid, fracking fluid, spotting fluid, clean-up fluid, production fluid, completion fluid, remedial treatment fluid, abandonment fluid, pill, acidizing fluid, and a cementing fluid. In addition, the at least one component of the downhole composition in the hollow interior of the one or more hollow hydrogel capsules can be at least one of a pigment, dye, marker.

In some embodiments, the method of using the hydrogel capsules is a method of accelerating curing downhole of cement or resin, such as an aqueous mixture including at least one of cement and cement kiln dust, or a resin. In such a method, the hydrogel capsules can be a component of a composition including a cementing fluid, such as an aqueous mixture including at least one of cement and cement kiln dust, or a resin. In addition, the at least one component of the downhole composition in the hollow interior of the one or more hollow hydrogel capsules can be a curing accelerator, such as a cement-curing accelerator or a resin-curing accelerator.

In some embodiments, the method of using the hydrogel capsules if a method of retarding curing downhole of a cement or resin, such as an aqueous mixture including at least one of cement and cement kiln dust, or a resin. In such a method, the hydrogel capsules can be a component of a composition including a cementing fluid, such as an aqueous mixture including at least one of cement and cement kiln dust, or a resin. In addition, the at least one component of the downhole composition in the hollow interior of the one or more hollow hydrogel capsules can be a curing retarder, such as a cement-curing retarder or a resin-curing retarder.

Hollow Hydrogel Capsule Composition for Treatment of a Subterranean Formation.

In various embodiments, the present invention provides a hydrogel capsule composition. The hydrogel capsule composition includes at least one hollow hydrogel capsule. The hollow hydrogel capsule includes a hydrogel shell. The hydrogel shell includes a polymerized composition that is hydrolyzed and crosslinked. The pre-polymerized composition includes at least one vinyl amine. The vinyl amine includes at least one hydrolytically deprotectable masked primary amine. The pre-polymerized composition also includes at least one polyvinyl compound. The hydrogel capsule also includes a hollow interior. The hollow interior includes at least one component of a composition for use downhole. The downhole composition is for subterranean petroleum or water well drilling, stimulation, clean-up, production, completion, abandonment, or a combination thereof. The crosslinking of the hydrolyzed and crosslinked polymerized composition includes crosslinking with at least one molecule including a plurality of functional groups condensable with primary amines. In examples, the hollow hydrogel capsule composition can include any suitable component in addition to the at least one hollow hydrogel capsule. The hydrogel capsule can be present in any suitable wt % in the composition. For example, the hydrogel capsule can be present in about 0.000,001 wt % or less, or about 0.000,01%, 0.000,1%, 0.001%, 0.01, 0.1, 1, 2, 3, 4, 5, 10, 15, 20, 30, 40, 50, 60, 70, 80, 85, 90, 95, 96, 97, 98, 99, 99.9, 99.99, 99.999, 99.999,9, or about 99.999,99 wt % or more of the composition. Upon the release of the cargo, the properties of the composition can be modified, including any suitable property consistent with the cargo described herein, for example density, viscosity, cure rate, pH, or chemical composition. In some examples, upon release of the cargo, the cargo chemically reacts with at least one component of the composition, causing the desired modification of the property of the composition.

In various embodiments, the hydrogel capsule composition also includes a downhole composition for subterranean petroleum or water well drilling, stimulation, clean-up, production, completion, abandonment, or a combination thereof. The downhole composition for subterranean petroleum or water well drilling, stimulation, clean-up, production, completion, abandonment, or a combination thereof can include a drilling fluid, stimulation fluid, fracking fluid, spotting fluid, clean-up fluid, production fluid, completion fluid, remedial treatment fluid, abandonment fluid, pill, acidizing fluid, cementing fluid, or a combination thereof.

A drilling fluid, also known as a drilling mud or simply "mud," is a specially designed fluid that is circulated through a wellbore as the wellbore is being drilled to facilitate the drilling operation. The drilling fluid can carry cuttings up from beneath and around the bit, transport them up the annulus, and allow their separation. Also, a drilling fluid can cool and lubricate the drill head as well as reducing friction between the drill string and the sides of the hole. The drilling fluid aids in support of the drill pipe and drill head, and provides a hydrostatic head to maintain the integrity of the wellbore walls and prevent well blowouts. Specific drilling fluid systems can be selected to optimize a drilling operation in accordance with the characteristics of a particular geological formation. The drilling fluid can be formulated to prevent unwanted influxes of formation fluids from permeable rocks penetrated and also to form a thin, low permeability filter cake which temporarily seals pores, other openings, and formations penetrated by the bit. In water-based drilling fluids, solid particles are suspended in a water or brine solution containing other components. Oils or other non-aqueous liquids can be emulsified in the water or brine or at least partially solubilized (for less hydrophobic non-aqueous liquids), but water is the continuous phase. In oil-based drilling fluids, solid particles are suspended in a continuous oil-based phase, and can optionally include an emulsified aqueous phase.

One or more hydrogel capsules can form a useful combination with drilling fluid. For example, the cargo of the capsule can be used to modify the viscosity of the drilling fluid at a desired time or in a desired place, such as before or after placing the drilling fluid downhole, or before, during, or after contacting a subterranean material with the drilling fluid. In some embodiments, the composition advantageously allows adjustment of the viscosity or other properties of the drilling fluid as needed while the drilling fluid is being used. In some examples, the composition allows the viscosity or other properties of the drilling fluid to be adjusted such that in one or more locations of the borehole the drilling fluid has one particular set of properties associated with contacting with the cargo of the hollow capsules, while in one or more other locations of the borehole the drilling fluid has different properties due to not being contacted with the cargo of the capsules. For example, during a drilling process, pressure can build up in the borehole due for example to penetration of the drill bit into a particular formation. The hollow hydrogel capsules can be triggered to release a particular cargo in the desired location such as near or above the pressure release, for example increasing the viscosity or density of the drilling fluid, thus timely preventing the increased pressure from causing a blowout or other undesirable consequences. In another example, during the drilling of porous material such as shale it can be desirable to prevent the influx of drilling fluid into the pores of the material to retain the stability of the material and thus of the stability of the borehole through the material. In some embodiments of the present invention, the viscosity of the drilling fluid proximate to the porous material can be increased to help prevent the influx of drilling fluid into the porous material, and thus preserve the integrity of the borehole.

A water-based drilling fluid in embodiments of the composition of the present invention can be any suitable water-based drilling fluid. In various embodiments, the drilling fluid can include at least one of water (fresh or brine), a salt (e.g., calcium chloride, sodium chloride, potassium chloride, magnesium chloride, calcium bromide, sodium bromide, potassium bromide, calcium nitrate, sodium formate, potassium formate, cesium formate), aqueous base (e.g., sodium hydroxide or potassium hydroxide), alcohol or polyol, cellulose, starches, alkalinity control agents, density control agents such as a density modifier (e.g. barium sulfate), surfactants (e.g. betaines, alkali metal alkylene acetates, sultaines, ether carboxylates), emulsifiers, dispersants, polymeric stabilizers, crosslinking agents, polyacrylamides, polymers or combinations of polymers, antioxidants, heat stabilizers, foam control agents, solvents, diluents, plasticizers, filler or inorganic particles (e.g. silica), pigments, dyes, precipitating agents (e.g., silicates or aluminum complexes), and rheology modifiers such as thickeners or viscosifiers (e.g. xanthan gum). Any ingredient listed in this paragraph can be either present or not present in the composition. A drilling fluid can be present in the composition in any suitable amount, such as about 1 wt % or less, about 2 wt %, 3, 4, 5, 10, 15, 20, 30, 40, 50, 60, 70, 80, 85, 90, 95, 96, 97, 98, 99, 99.9, 99.99, 99.999, or about 99.9999 wt % or more of the composition.

An oil-based drilling fluid or mud in embodiments of the composition of the present invention can be any suitable oil-based drilling fluid. In various embodiments the drilling fluid can include at least one of a based oil (or synthetic fluid), saline, aqueous solution, emulsifiers, other agents of additives for suspension control, weight or density control, oil-wetting agents, fluid loss or filtration control agents, and rheology control agents. For example, see H. C. H. Darley and George R. Gray, Composition and Properties of Drilling and Completion Fluids 66-67, 561-562 ($5^{th}$ ed. 1988). An oil-based or invert emulsion-based drilling fluid can include between about 50:50 to about 95:5 by volume of oil phase to water phase. A substantially all oil mud includes about 100% liquid phase oil by volume; e.g., substantially no internal aqueous phase.

The composition can include an aqueous mixture of at least one of cement and cement kiln dust. The hydrogel capsule can form a useful combination with cement or cement kiln dust, for example by modifying the viscosity or other properties of the cement at a desired time or in a desired place, or by creating a porous cement using hydrogel capsules having a gaseous cargo. For example, during the cementing phase of forming a well for petroleum extraction, some or parts of a particular borehole may require a thicker cement composition to allow the cement composition to properly set or to behave in another desired manner, while other parts of the borehole may not require as thick of a cement. A thicker cement can be more difficult to pump downhole. Various embodiments of the present invention allow for thickening of the cement or variation of other properties of the cement near or at the location where the thickened or otherwise modified material is desired. In another example, embodiments allow variation of the viscosity or other properties of the cement pumped downhole, such that a thicker or otherwise modified portion of cement can be placed downhole before, after, or between segments of cements having lower viscosity or other different properties. In another example, other properties of the cement near or at a desired location can be advantageously varied downhole.

The cement kiln dust can be any suitable cement kiln dust. Cement kiln dust can be formed during the manufacture of cement and can be partially calcined kiln feed which is removed from the gas stream and collected in a dust collector during manufacturing process. Cement kiln dust can be advantageously utilized in a cost-effective manner since kiln dust is often regarded as a low value waste product of the cement industry. Some embodiments of the composition can include cement kiln dust but no cement, cement kiln dust and cement, or cement but no cement kiln dust. The cement can be any suitable cement. The cement can be a hydraulic cement. A variety of cements can be utilized in accordance with the present invention, for example, those including calcium, aluminum, silicon, oxygen, iron, or sulfur, which can set and harden by reaction with water. Suitable cements can include Portland cements, pozzolana cements, gypsum cements, high alumina content cements, slag cements, silica cements, and combinations thereof. In some embodiments, the Portland cements that are suitable for use in the present invention are classified as Classes A, C, H, and G cements according to the American Petroleum Institute, *API Specification for Materials and Testing for Well Cements*, API Specification 10, Fifth Ed., Jul. 1, 1990. A cement can be generally included in the composition in an amount sufficient to provide the desired compressive strength, density, or cost. In some embodiments, the hydraulic cement can be present in the composition in an amount in the range of from 0 wt % to about 100 wt %, 0-95 wt %, 20-95 wt %, or about 50-90 wt %. A cement kiln dust can be present in an amount of at least about 0.01 wt %, or about 5 wt %-80 wt %, or about 10 wt % to about 50 wt %.

Optionally, other additives can be added to a cement or kiln dust-containing composition of the present invention as deemed appropriate by one skilled in the art, with the benefit of this disclosure. Any optional ingredient listed in this paragraph can be either present or not present in the composition. For example, the composition can include fly ash, metakaolin, shale, zeolite, set retarding additive, surfactant, a gas, accelerators, weight reducing additives, heavy-weight additives, lost circulation materials, filtration control additives, dispersants, and combinations thereof. In some examples, additives can include crystalline silica compounds, amorphous silica, salts, fibers, hydratable clays, microspheres, pozzolan lime, thixotropic additives, combinations thereof, and the like.

A pill is a relatively small quantity (e.g. less than about 500 bbl, or less than about 200 bbl) of drilling fluid used to accomplish a specific task that the regular drilling fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy filter cake and relieve differential sticking forces. In another example, a pill is a lost circulation material pill to, for example, plug a thief zone. A pill can include any component described herein as a component of a drilling fluid.

Hollow Hydrogel Capsule.

In various embodiments, the present invention provides a hollow hydrogel capsule. The hollow hydrogel capsule includes a hydrogel shell. The hydrogel shell includes a polymerized composition that is hydrolyzed and crosslinked. The pre-polymerized composition includes at least one vinyl amine. The vinyl amine includes at least one hydrolytically deprotectable masked primary amine. The pre-polymerized composition also includes at least one polyvinyl compound. The hydrogel capsule also includes a hollow interior. The hollow interior includes at least one component of a composition for use downhole. The downhole composition is for subterranean petroleum or water well drilling, stimulation, clean-up, production, completion, abandonment, or a combination thereof. The crosslinking of the hydrolyzed and crosslinked polymerized composition includes crosslinking with at least one molecule including a plurality of functional groups condensable with primary amines.

The hollow interior of the capsule includes a cargo, wherein the cargo is at least one component of a composition for use downhole for subterranean petroleum or water well drilling, stimulation, clean-up, production, completion, abandonment, or a combination thereof. The composition for subterranean petroleum or water well drilling, stimulation, clean-up, production, completion, abandonment, or a combination thereof can be any suitable drilling fluid, stimulation fluid, fracking fluid, spotting fluid, clean-up fluid, production fluid, completion fluid, remedial treatment fluid, abandonment fluid, pill, acidizing fluid, cementing fluid, or a combination thereof. The component of the composition for use downhole can be any suitable component, particularly a component that is advantageously delivered in a targeted fashion with respect to at least one of time, location, and rate of release. In some examples, the component of the composition for use downhole can be water, saline, salt, aqueous base, oil, organic solvent, synthetic fluid oil phase, aqueous solution, alcohol or polyol, cellulose, starch, alkalinity control agent, density control agent, density modifier, surfactant, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, rheology modifier, oil-wetting agent, set retarding additive, surfactant, gas, accelerator, weight reducing additive, heavy-weight additive, lost circulation material, filtration control additive, dispersant, salts, fiber, thixotropic additive, breaker, crosslinker, gas, rheology modifier, density control agent, curing accelerator (e.g., cement-curing accelerator or resin-curing accelerator), curing retarder (e.g., cement-curing retarder or resin-curing retarder), pH modifier, chelating agent, scale inhibitor, enzyme, resin, water control material, polymer, oxidizer, and a marker (e.g., a radioactive marker, fluorescent marker, or other marker). The hollow interior can include a solvent, such as a solution including a solvent. The solvent can be any suitable solvent, such as water; the solution can be an aqueous solution.

The pre-polymerized composition includes at least one vinyl amine. The vinyl amine includes at least one hydrolytically deprotectable masked primary amine. The hydrolytically deprotectable masked primary amine can be any functional group that can be exposed to hydrolytic conditions (e.g., acidic or basic) to yield a primary amine group. For example, examples of the hydrolytically deprotectable masked primary amine can include an acylamine group (e.g., N-formyl, N-acetyl, N-chloroacetyl, N-trichloroacetyl, N-acetoacetyl, N-2-methyl-2-(o-phenylazophenoxy)priopionyl, N-benzoyl, or N-dithiasuccinoyl), a cyano group, a thioacylamine group, a carbamate (e.g., 2-trimethylsilylethyl carbamate, 1-methyl-1-(4-biphenyeethyl carbamate, 1,1-dimethyl-2-haloethyl carbamate, t-butyl carbamate, cyclobutyl carbamate, 1-methylcyclobutyl carbamate, or 1-adamantyl carbamate), or another protected primary amine group (e.g., N-tetrahydropyranyl, N-di(p-methoxyphenyl)methyl, N-triphenylmethyl, N-(p-methoxyphenyl)diphenylmethyl, N-diphenylphosphinyl, N-dimethylthiophosphinyl, or N-o-nitrobenzenesunfenyl). The hydrolytically deprotectable masked primary amine can be

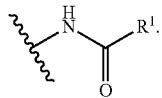

The variable $R^1$ can be independently at each occurrence selected from H and $(C_1-C_{10})$alkyl. In some examples, the hydrolytically deprotectable group is a formylamine (e.g., formamide).

The vinyl amine including the masked primary amine can have one vinyl group and one masked primary amine. The vinyl amine can be linked to the masked primary amine via a linking group. The vinyl amine including the masked primary amine can have the following structure

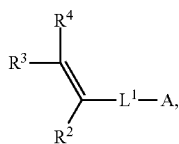

Each of $R^2$, $R^3$, and $R^4$ independently at each occurrence can be selected from hydrogen, F, Cl, Br, I, CN, $CF_3$, $OCF_3$, $(C_1-C_{10})$alkoxy, and $(C_1-C_{10})$alkyl. The variable $L^1$ can be selected from a bond, O, S, C(O), S(O), methylenedioxy, ethylenedioxy, NR, $SR_2$, $SO_2R$, $SO_2NR$, $SO_3$, C(O)C(O), C(O)CH$_2$C(O), C(S), C(O)O, OC(O), OC(O)O, C(O)NR, OC(O)NR, C(S)NR, $(CH_2)_{0-2}$NHC(O), N(R)N(R)C(O), N(R)N(R)C(O)O, N(R)N(R)C(O)NR, N(R)SO$_2$, N(R)SO$_2$NR, N(R)C(O)O, N(R)C(O), N(R)C(S), N(R)C(O)NR, N(R)C(S)NR, N(C(O)R)C(O), N(OR), C(=NH)NR, C(O)N(OR), C(=NOR), $(C_1-C_{30})$alkylene, $(C_2-C_{30})$alkenylene, $(C_2-C_{30})$alkynylene, $(C_1-C_{30})$haloalkylene, $(C_1-C_{30})$alkoxylene, $(C_1-C_{30})$haloalkoxylene, $(C_4-C_{30})$cycloalkyl$(C_0-C_{30})$alkylene, $(C_1-C_{30})$heterocyclyl$(C_0-C_{30})$alkylene, $(C_6-C_{30})$aryl$(C_0-C_{30})$alkylene, and $(C_1-C_{30})$heteroaryl$(C_0-C_{30})$alkylene, wherein each alkylene, alkenylene, alkynylene, haloalkylene, alkoxylene, haloalkoxylene, cycloalkylene, arylene, heterocyclylene, and heteroarylene is independently unsubstituted or further substituted with at least one J. The variable J independently at each occurrence can be selected from F, Cl, Br, I, OR, CN, $CF_3$, $OCF_3$, R, O, S, C(O), S(O), methylenedioxy, ethylenedioxy, N(R)$_2$, SR, S(O)R, $SO_2R$, $SO_2N(R)_2$, $SO_3R$, C(O)R, C(O)C(O)R, C(O)CH$_2$C(O)R, C(S)R, C(O)OR, OC(O)R, OC(O)OR, C(O)N(R)$_2$, OC(O)N(R)$_2$, C(S)N(R)$_2$, $(CH_2)_{0-2}$NHC(O)R, N(R)N(R)C(O)R, N(R)N(R)C(O)OR, N(R)N(R)C(O)N(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(C(O)R)C(O)R, N(OR)R, C(=NH)N(R)$_2$, C(O)N(OR)R, and C(=NOR)R, wherein each alkyl, cycloalkyl, cycloalkylalkyl, aryl, aralkyl, heterocyclyl, heterocyclylalkyl, heteroaryl, and heteroarylalkyl is independently unsubstituted or substituted with 1-3 J. The variable R independently at each occurrence can be selected from hydrogen, $(C_1-C_{10})$alkyl, $(C_4-C_{10})$cycloalkyl, $(C_4-C_{10})$cycloalkyl$(C_1-C_{10})$alkyl, $(C_6-C_{10})$aryl, $(C_1-C_{10})$aralkyl, $(C_1-C_{10})$heterocyclyl, $(C_1-C_{10})$heterocyclyl$(C_1-C_{10})$alkyl, $(C_1-C_{10})$heteroaryl, and $(C_1-C_{10})$heteroaryl$(C_1-C_{10})$alkyl. The variable A can be the hydrolytically deprotectable masked primary amine. In some examples, at least one of $R^2$, $R^3$, and $R^4$ is H. For example, $R^3$ and $R^4$ can be H, or $R^2$, $R^3$, and $R^4$ can be H. In some embodiments, the variable $L^1$ can be selected from O, C(O), NH, C(O)O, OC(O), OC(O)O, C(O)NH, OC(O)NH, NHC(O), NHC(O)NH, $(C_1-C_{30})$alkylene, $(C_1-C_{30})$haloalkylene, wherein each alkylene and haloalkylene is independently unsubstituted or further substituted with at least one J. The variable $L^1$ can be a covalent bond between the vinyl group and the masked primary amine. In some examples, the vinyl amine including the masked primary amine is N-vinyl formamide,

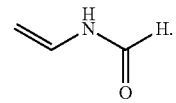

The pre-polymerized composition also includes at least one polyvinyl compound. The polyvinyl compound includes hydrolyzable bonds that are at least partially hydrolyzed in the hydrogel shell. In some examples, the polyvinyl molecule has two vinyl groups. In some embodiments, the polyvinyl molecule can have the following structure

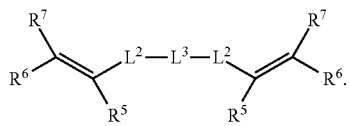

Each of $R^5$, $R^6$, and $R^7$ can be independently at each occurrence selected from hydrogen, F, Cl, Br, I, CN, $CF_3$, $OCF_3$, $(C_1-C_{10})$alkoxy, and $(C_1-C_{10})$alkyl. The variable $L^2$ can be independently at each occurrence selected from a bond, O, S, C(O), S(O), methylenedioxy, ethylenedioxy, NR', SR'$_2$, SO$_2$R', SO$_2$NR', SO$_3$, C(O)C(O), C(O)CH$_2$C(O), C(S), C(O)O, OC(O), OC(O)O, C(O)NR', OC(O)NR', C(S)NR', $(CH_2)_{0-2}$NHC(O), N(R')N(R')C(O), N(R')N(R')C(O)O, N(R')N(R')C(O)NR', N(R')SO$_2$, N(R')SO$_2$NR', N(R')C(O)

O, N(R')C(O), N(R')C(S), N(R')C(O)NR', N(R')C(S)NR', N(C(O)R')C(O), N(OR'), C(=NH)NR', C(O)N(OR'), and C(=NOR'). The variable $L^3$ can be independently at each occurrence selected from $(C_1-C_{30})$alkylene, $(C_1-C_{30})$haloalkylene, $(C_0-C_{30})$alkyl$(C_4-C_{30})$cycloalkyl$(C_0-C_{30})$alkylene, $(C_0-C_{30})$alkyl$(C_1-C_{30})$heterocyclyl$(C_0-C_{30})$alkylene, $(C_0-C_{30})$alkyl$(C_6-C_{30})$aryl$(C_0-C_{30})$alkylene, and $(C_0-C_{30})$alkyl$(C_1-C_{30})$heteroaryl$(C_0-C_{30})$alkylene; each alkylene, haloalkylene, cycloalkylene, arylene, heterocyclylene, and heteroarylene can be independently unsubstituted or further substituted with at least one J'. The variable J' independently at each occurrence can be selected from F, Cl, Br, I, OR', CN, CF$_3$, OCF$_3$, R', O, S, C(O), S(O), methylenedioxy, ethylenedioxy, N(R')$_2$, SR', S(O)R', SO$_2$R', SO$_2$N(R')$_2$, SO$_3$R', C(O)R', C(O)C(O)R', C(O)CH$_2$C(O)R', C(S)R', C(O)OR', OC(O)R', OC(O)OR', C(O)N(R')$_2$, OC(O)N(R')$_2$, C(S)N(R')$_2$, (CH$_2$)$_{0-2}$NHC(O)R', N(R')N(R')C(O)R', N(R')N(R')C(O)OR', N(R')N(R')C(O)N(R')$_2$, N(R')SO$_2$R', N(R')SO$_2$N(R')$_2$, N(R')C(O)OR', N(R')C(O)R', N(R')C(S)R', N(R')C(O)N(R')$_2$, N(R')C(S)N(R')$_2$, N(C(O)R')C(O)R', N(OR')R', C(=NH)N(R')$_2$, C(O)N(OR')R', and C(=NOR')R'. The variable R' can be independently at each occurrence selected from hydrogen, $(C_1-C_{10})$alkyl, $(C_4-C_{10})$cycloalkyl, $(C_4-C_{10})$cycloalkyl$(C_1-C_{10})$alkyl, $(C_6-C_{10})$aryl, $(C_1-C_{10})$aralkyl, $(C_1-C_{10})$heterocyclyl, $(C_1-C_{10})$heterocyclyl$(C_1-C_{10})$alkyl, $(C_1-C_{10})$heteroaryl, and $(C_1-C_{10})$heteroaryl$(C_1-C_{10})$alkyl; each alkyl, cycloalkyl, cycloalkylalkyl, aryl, aralkyl, heterocyclyl, heterocyclylalkyl, heteroaryl, and heteroarylalkyl can be independently unsubstituted or substituted with 1-3 J'. In some examples, at least one of $R^5$, $R^6$, and $R^7$ is hydrogen. For example, each of $R^6$ and $R^7$ can be hydrogen, or each of $R^5$, $R^6$, and $R^7$ can be hydrogen. In some examples, $L^2$ can be independently at each occurrence selected from a bond, O, S, C(O), S(O), methylenedioxy, ethylenedioxy, NH, SH$_2$, SO$_2$H, SO$_2$NH, SO$_3$, C(O)C(O), C(O)CH$_2$C(O), C(S), C(O)O, OC(O), OC(O)O, C(O)NH, OC(O)NH, C(S)NH, (CH$_2$)$_{0-2}$NHC(O), NHNHC(O), NHNHC(O)O, NHNHC(O)NH, N(R')SO$_2$, NHSO$_2$NH, NHC(O)O, NHC(O), NHC(S), NHC(O)NH, NHC(S)NH, N(C(O)H)C(O), N(OH), C(=NH)NH, C(O)N(OH), and C(=NOH). In some examples, $L^2$ can be independently at each occurrence selected from O, C(O), NH, C(O)O, OC(O), OC(O)O, C(O)NH, OC(O)NH, NHC(O)O, NHC(O), and NHC(O)NH. The variable $L^2$ can be —C(O)NH—, wherein the C(O) group is bound directly to the vinyl group. In some examples, $L^3$ can be independently at each occurrence selected from $(C_1-C_{10})$alkylene, $(C_1-C_{10})$haloalkylene, $(C_0-C_{10})$alkyl$(C_4-C_{10})$cycloalkyl$(C_0-C_{10})$alkyl, $(C_0-C_{10})$alkyl$(C_1-C_{30})$heterocyclyl$(C_0-C_{10})$alkyl, $(C_0-C_{10})$alkyl$(C_6-C_{30})$aryl$(C_0-C_{10})$alkyl, and $(C_1-C_{30})$heteroaryl$(C_0-C_{30})$alkyl; wherein each alkyl, haloalkyl, cycloalkyl, aryl, heterocyclyl, and heteroaryl is independently unsubstituted or further substituted with at least one J'. In some examples, $L^3$ can be independently at each occurrence selected from $(C_1-C_{10})$alkylene and $(C_1-C_{10})$haloalkylene. The variable $L^3$ can be —CH$_2$—. In some embodiments, the polyvinyl compound can be N,N'-methylenebis(acrylamide),

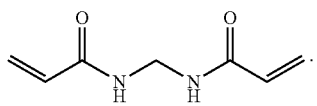

The crosslinking of the hydrolyzed and crosslinked polymerized composition includes crosslinking with at least one molecule including a plurality of functional groups condensable with primary amines. In various embodiments, the at least one molecule including a plurality of functional groups condensable with primary amines has two functional groups condensable with primary amines. In some examples, the at least one molecule including a plurality of functional groups condensable with primary amines can have the following structure

D-L$^4$-D.

The variable $L^4$ can be independently at each occurrence selected from $(C_1-C_{30})$alkylene, $(C_1-C_{30})$haloalkylene, $(C_0-C_{30})$alkyl$(C_4-C_{30})$cycloalkyl$(C_0-C_{30})$alkylene, $(C_0-C_{30})$alkyl$(C_1-C_{30})$heterocyclyl$(C_0-C_{30})$alkylene, $(C_0-C_{30})$alkyl$(C_6-C_{30})$aryl$(C_0-C_{30})$alkylene, and $(C_0-C_{30})$alkyl$(C_1-C_{30})$heteroaryl$(C_0-C_{30})$alkylene, wherein each alkylene, haloalkylene, cycloalkylene, arylene, heterocyclylene, and heteroarylene is independently unsubstituted or further substituted with at least one J''. The variable D can be independently at each occurrence selected from CN, O, S, C(O), S(O), SR'', S(O)R'', SO$_2$R'', SO$_2$N(R'')$_2$, SO$_3$R'', C(O)R'', C(O)C(O)R'', C(O)CH$_2$C(O)R'', C(S)R'', C(O)OR'', OC(O)R'', OC(O)OR'', C(O)N(R'')$_2$, OC(O)N(R'')$_2$, C(S)N(R'')$_2$, N(R'')C(O)OR'', N(R'')C(S)R'', N(R'')C(O)N(R'')$_2$, N(R'')C(S)N(R'')$_2$, C(=NH)N(R'')$_2$, C(O)N(OR'')R'', and C(=NOR''). The variable J'' can be independently at each occurrence selected from F, Cl, Br, I, OR'', CN, CF$_3$, OCF$_3$, R'', O, S, C(O), S(O), methylenedioxy, ethylenedioxy, N(R'')$_2$, SR'', S(O)R'', SO$_2$R'', SO$_2$N(R'')$_2$, SO$_3$R'', C(O)R'', C(O)C(O)R'', C(O)CH$_2$C(O)R'', C(S)R'', C(O)OR'', OC(O)R'', OC(O)OR'', C(O)N(R'')$_2$, OC(O)N(R'')$_2$, C(S)N(R'')$_2$, (CH$_2$)$_{0-2}$NHC(O)R'', N(R'')N(R'')C(O)R'', N(R'')N(R'')C(O)OR'', N(R'')N(R'')C(O)N(R'')$_2$, N(R'')SO$_2$R'', N(R'')SO$_2$N(R'')$_2$, N(R'')C(O)OR'', N(R'')C(O)R'', N(R'')C(S)R'', N(R'')C(O)N(R'')$_2$, N(R'')C(S)N(R'')$_2$, N(C(O)R'')C(O)R'', N(OR'')R'', C(=NH)N(R'')$_2$, C(O)N(OR'')R'', and C(=NOR'')R''. The variable R'' can be independently at each occurrence selected from hydrogen, $(C_1-C_{10})$alkyl, $(C_4-C_{10})$cycloalkyl, $(C_4-C_{10})$cycloalkyl$(C_1-C_{10})$alkyl, $(C_6-C_{10})$aryl, $(C_1-C_{10})$aralkyl, $(C_1-C_{10})$heterocyclyl, $(C_1-C_{10})$heterocyclyl$(C_1-C_{10})$alkyl, $(C_1-C_{10})$heteroaryl, and $(C_1-C_{10})$heteroaryl$(C_1-C_{10})$alkyl, wherein each alkyl, cycloalkyl, cycloalkylalkyl, aryl, aralkyl, heterocyclyl, heterocyclylalkyl, heteroaryl, and heteroarylalkyl is independently unsubstituted or substituted with 1-3 J''. The variable D can be independently at each occurrence selected from O, C(O), S(O)H, SO$_2$H, SO$_3$H, C(O)H, C(O)C(O)H, C(O)CH$_2$C(O)H, C(S)H, C(O)OH, OC(O)H, OC(O)OH, N(R'')C(O)OH, N(R'')C(S)H, and C(=NOH)H. In some examples, D is —C(O)H. In some embodiments, $L^4$ can be $(C_1-C_{10})$alkylene independently unsubstituted or further substituted with at least one J''. In some embodiments, $L^4$ is propylene, —CH$_2$—CH$_2$—CH$_2$—. In various embodiments, the at least one molecule including a plurality of functional groups condensable with primary amines can be glutaraldehyde,

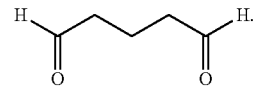

The hydrogel capsule shell can includes a plurality of primary amine groups, wherein the primary amine groups can be at least one of on the surface of the capsule, on the interior wall of the capsule, and within the walls of the capsule. The hollow capsule can be substantially spherical, approximately spherical, or can have a shape resembling that of a partially deflated balloon. The capsule can have any suitable diameter. For example, the diameter of the capsule can be about 0.01 µm-100 µm, 0.1 µm-20 µm, or about 1 µm-4 µm. In some examples, the shell of the hollow capsule has a thickness of about 0.001 µm-20 µm, 0.01 µm-10 µm, or about 0.02 µm-1.0 µm. In some examples, the shell has a mesh-like network, such that pathways through the mesh can be considered pores. The shell can have any suitable pore size, such as about 0.0001 nm-100 nm, or about 1 nm-40 nm.

In various embodiments, the interior of the capsule includes a release modifier. As used herein, the term "release modifier" refers to a substance or material that alters the rate of release of a cargo within a hollow hydrogel capsule. The alteration can be an increase, or decrease in the rate of release. For example, the release modifier can allow the rate to be changed from a slow or substantially zero rate to a faster (e.g., increasing porosity or enabling diffusion of various materials to the interior to force other materials out) or substantially infinite rate (e.g. bursting). The release modifier can itself cause the modification of release rate (e.g. chemical reaction with hydrogel capsule walls), or the release modifier can operate in tandem with other phenomenon to cause the release (e.g., with laser light to cause heating, reaction with other chemicals to change release rate, and the like). In some examples, the release modifier includes an organic acid, a mineral acid, a caustic material, a heat-activated material, or a nanoparticle.

In some examples, the hydrogel shell includes metal nanoparticles. The metal nanoparticles can include any metal. For example, the metal nanoparticles can be gold nanoparticles. The metal nanoparticles can be at least one of a) within the hydrogel shell, and b) on the outer surface of the hydrogel shell. The hydrogel shell can include any suitable number of nanoparticles. In some examples, the hydrogel shell includes about 1-100,000 nanoparticles, or 10-10,000 nanoparticles. In some embodiments, the average diameter of the nanoparticles is about 0.01 nm-100 nm, 0.1 nm-50 nm, 1 nm-10 nm, 2 nm-6 nm, 15 nm-25 nm, 18 nm-22 nm.

In some examples, the hollow capsule can further include at least one molecule that has at least one of reacted with or formed an electrostatic bond with a primary amine group on the shell, such that the molecule lowers or limits the permeability of the hollow hydrogel capsule. The at least one molecule that has reacted with or formed an electrostatic bond with the primary amine group on the shell can be an organic compound that includes at least one functional group selected from CN, O, S, C(O), S(O), SR''', S(O)R''', SO$_2$R''', SO$_2$N(R''')$_2$, SO$_3$R''', C(O)R''', C(O)C(O)R''', C(O)CH$_2$C(O)R''', C(S)R''', C(O)OR''', OC(O)R''', OC(O)OR''', C(O)N(R''')$_2$, OC(O)N(R''')$_2$, C(S)N(R''')$_2$, N(R''')C(O)OR''', N(R''')C(S)R''', N(R''')C(O)N(R''')$_2$, N(R''')C(S)N(R''')$_2$, C(=NH)N(R''')$_2$, C(O)N(OR''')R''', and C(=NOR'''). The variable R''' can be independently at each occurrence selected from hydrogen, (C$_1$-C$_{10}$)alkyl, (C$_4$-C$_{10}$)cycloalkyl, (C$_4$-C$_{10}$)cycloalkyl(C$_1$-C$_{10}$)alkyl, (C$_6$-C$_{10}$)aryl, (C$_1$-C$_{10}$)aralkyl, (C$_1$-C$_{10}$)heterocyclyl, (C$_1$-C$_{10}$)heterocyclyl(C$_1$-C$_{10}$)alkyl, (C$_1$-C$_{10}$)heteroaryl, and (C$_1$-C$_{10}$)heteroaryl(C$_1$-C$_{10}$)alkyl, wherein each alkyl, cycloalkyl, cycloalkylalkyl, aryl, aralkyl, heterocyclyl, heterocyclylalkyl, heteroaryl, and heteroarylalkyl is independently unsubstituted or substituted with 1-3 J'''. The variable J''' is independently at each occurrence selected from F, Cl, Br, I, OR''', CN, CF$_3$, OCF$_3$, R''', O, S, C(O), S(O), methylenedioxy, ethylenedioxy, N(R''')$_2$, SR''', S(O)R''', SO$_2$R''', SO$_2$N(R''')$_2$, SO$_3$R''', C(O)R''', C(O)C(O)R''', C(O)CH$_2$C(O)R''', C(S)R''', C(O)OR''', OC(O)R''', OC(O)OR''', C(O)N(R''')$_2$, OC(O)N(R''')$_2$, C(S)N(R''')$_2$, (CH$_2$)$_{0-2}$NHC(O)R''', N(R''')C(O)R''', N(R''')N(R''')C(O)OR''', N(R''')N(R''')C(O)N(R''')$_2$, N(R''')SO$_2$R''', N(R''')SO$_2$N(R''')$_2$, N(R''')C(O)OR''', N(R''')C(O)R''', N(R''')C(S)R''', N(R''')C(O)N(R''')$_2$, N(R''')C(S)N(R''')$_2$, N(C(O)R''')C(O)R''', N(OR''')R''', C(=NH)N(R''')$_2$, C(O)N(OR''')R''', and C(=NOR''')R'''. In some embodiments, the at least one molecule that has reacted with or formed an electrostatic bond with the primary amine group on the shell can be an organic compound that includes at least one functional group selected from O, C(O), S(O)H, SO$_2$H, SO$_3$H, C(O)H, C(O)C(O)H, C(O)CH$_2$C(O)H, C(S)H, C(O)OH, OC(O)H, OC(O)OH, N(R'')C(O)OH, N(R'')C(S)H, and C(=NOH)H. In some examples, the at least one molecule that has reacted with or formed an electrostatic bond with the primary amine group on the shell is a polymeric carboxylic-acid-containing molecule, wherein the reaction with the primary amine group includes a condensation between a carboxylic acid group on the polymeric carboxylic-acid-containing molecule and the primary amine group or acidification of the primary amine group with a proton from the carboxylic acid and subsequent ionic- or other electrostatic-pairing of the carboxylate group and the ammonium group. The organic compound can be a (C$_2$-C$_{600,000}$)hydrocarbyl group, for example, hyaluronic acid.

Method of Making the Hollow Hydrogel Capsule.

In various embodiments, the present invention provides a method of making a hollow hydrogel capsule. The hollow hydrogel capsule includes a hydrogel shell. The hydrogel shell includes a polymerized composition that is hydrolyzed and crosslinked. The pre-polymerized composition includes at least one vinyl amine. The vinyl amine includes at least one hydrolytically deprotectable masked primary amine. The pre-polymerized composition also includes at least one polyvinyl compound. The hydrogel capsule also includes a hollow interior. The hollow interior includes at least one component of a composition for use downhole. The downhole composition is for subterranean petroleum or water well drilling, stimulation, clean-up, production, completion, abandonment, or a combination thereof. The crosslinking of the hydrolyzed and crosslinked polymerized composition includes crosslinking with at least one molecule including a plurality of functional groups condensable with primary amines. The method can be any suitable method.

The vinyl amine and polyvinyl compound can be present in any suitable proportions in the pre-polymerized composition. For example, the vinyl amine can be present at about 0.000,001 mol % or less, or about 0.000,01%, 0.000,1%, 0.001%, 0.01, 0.1, 1, 2, 3, 4, 5, 10, 15, 20, 30, 40, 50, 60, 70, 80, 85, 90, 95, 96, 97, 98, 99, 99.9, 99.99, 99.999, 99.999,9, or about 99.999,99 mol % or more, with respect to the total moles of vinyl amine and polyvinyl compound.

In some embodiments, the method includes polymerizing the pre-polymerized composition including the at least one vinyl amine including the hydrolytically deprotectable masked primary amine, and the at least one polyvinyl compound. The polymerizing gives a first polymer. In some embodiments, the polymerized composition can be a dispersion polymerized composition, such as a free-radical polymerization from an emulsion including the monomer. The polymerization can be conducted with or without one or more polymerization initiators. In some examples, prior to hydrolysis and crosslinking the polymerized composition includes particles. The method also includes hydrolyzing the first polymer, to deprotect at least some of the masked primary amine. The hydrolyzing gives a second polymer. The method also includes cross-linking the second polymer with the at least one molecule including the plurality of functional groups condensable with primary amines. The crosslinking give the hydrogel shell including the hydrolyzed and crosslinked polymerized composition. The hydrolyzing of the first polymer and the cross-linking of the second polymer can be carried out at least one of in situ, sequentially, and simultaneously.

The crosslinker can be present in any suitable proportions in the pre-crosslinked composition. For example, the crosslinker can be present at about 0.000,001 mol % or less, or about 0.000,01%, 0.000,1%, 0.001%, 0.01, 0.1, 1, 2, 3, 4, 5, 10, 15, 20, 30, 40, 50, 60, 70, 80, 85, 90, 95, 96, 97, 98, 99, 99.9, 99.99, 99.999, 99.999,9, or about 99.999,99 mol % or more, with respect to the total moles of polymer and crosslinker.

The method can be a template-free method for making the hollow hydrogel capsules, which can avoid procedures such as the use of a template material that is dissolved away or otherwise removed after formation of the hollow particles. By avoiding the use of templates, the method is more flexible, is easier to perform, and can generate material that is more valuable than material formed using a template-procedure.

The method can include loading at least one cargo into the hollow interior of the hollow capsule. The loading can be performed by allowing the at least one cargo to diffuse into the hollow interior of the hydrogel capsule. The loading can be performed by forming the hollow capsule in a medium that contains the cargo desired to be loaded, thereby forming the capsule around the cargo. The loading can be via diffusion of a compound to the interior of the capsule wherein a chemical reaction can occur between the compound and a material within the interior of the capsule to form the desired cargo.

In some embodiments, the method can further include reacting the hydrogel capsule with a permeability modifier. The reacting gives a hydrogel capsule having modified permeability of the hydrogel shell (e.g., raising the rate of diffusion of a particular size of molecule). The permeability of the hydrogel shell can be modified after loading at least one cargo into the hollow interior of the hydrogel capsule. In some examples, the method can include forming metal nanoparticles at least one of one and in the hydrogel shell.

EXAMPLES

The present invention can be better understood by reference to the following examples which are offered by way of illustration. The present invention is not limited to the examples given herein.

At least some of the below Examples appear in Kim, J et al., Langmuir 2012, 28, 11899-11905.

General. N-Vinylformamide (NVF), N,N'-methylenebis (acrylamide) (MBA), poly(2-ethyl-2-oxazoline) (Mw ~50 kDa), glutaraldehyde (GA) solution (50% in $H_2O$), fluorescein isothiocyanate (FITC), FITC-dextran (Mw≈4 kDa, 40 kDa, 250 kDa, 500 kDa), and fluorescein sodium salt were purchased from Sigma-Aldrich-Fluka. α,α'-Azobis(isobutyronitrile) (AIBN) was purchased from Junsei Chemical Co., Ltd., and sodium hydroxide and methanol were purchased from Samchun Pure Chemical Co., Ltd. Hyaluronic acid (HA) sodium salts of various molecular weights were kindly supplied by Bioland Co. Ltd. Hydrogen tetrachloroaurate (III) hydrate ($HAuCl_4 \cdot nH_2O$, n=3.7) was purchased from Kojima Chemicals Co., Ltd. 0.1 M borate buffer (pH 10) was received from J. T. Baker. All of the chemicals were used as received.

Example 1. Synthesis of Hollow Hydrogel Capsules

The hollow hydrogel capsules were prepared by using an in situ hydrolysis/cross-linking reaction, as reported in Han, J.-H. et al., *Chem. Commun.* 2008, 984-986. First, poly(N-vinylformamide) (PNVF) particles were produced by using dispersion polymerization. A mixture of 19.8 g of NVF and 0.2 g of MBA was polymerized at 70° C. for 24 h in 200 mL of methanol containing an initiator (AIBN, 0.1 g) and a stabilizer (poly(2-ethyl-2-oxazoline), 2 g) under a $N_2$ atmosphere. The stirring speed was fixed at 70 rpm. After polymerization, unreacted monomers and additives were removed by repeated centrifugation with methanol. The diameter of the PNVF particles was 1.81±0.17 μm. The PNVF particles (~1 g) were then redispersed in 140 mL methanol containing 50% GA solution (20 g for 0.1 mol of GA, 10 g for 0.05 mol, 4 g for 0.02 mol, 3 g for 0.015 mol, 2 g for 0.01 mol). While stirring each PNVF particle dispersion, 50 g of 2 N NaOH aqueous solution was slowly added, and the reaction proceeded at 70° C. for 12 h under a $N_2$ atmosphere. After washing the particles thoroughly through repeated centrifugation with water, uniform hollow-structured PVAm hydrogel capsules were obtained.

Example 2. Characterization of Hollow Hydrogel Capsules

The structure of the PVAm capsules was confirmed by direct observation with a confocal laser scanning microscope (Zeiss LSM 510, Germany). To confirm their microstructure, the hydrogel capsules were labeled with a fluorescent dye. A 0.2 mL aliquot of FITC solution (2 mg/mL in dimethyl sulfoxide (DMSO)) was added to the capsule dispersion (0.2 mL), then diluted with water (1.1 mL). The mixture shaken for 4 h under light-shielded conditions was washed by repeated centrifugation with water. The average capsule sizes and shell thicknesses were determined by analyzing the confocal laser scanning microscopy (CLSM) images. Scanning electron microscopy (SEM) observation was also performed after lyophilization of the hollow hydrogel capsules.

Example 3. Control of Permeability of Hollow Hydrogel Capsules

To modify the surface properties of the hollow hydrogel capsules, they were treated with an HA solution (1 mg/mL in 0.15 N NaCl) for 1 h and then washed by repeated centrifugation with water. The HA solution contains 0.15 N NaCl. NaCl was added in order to tune the ionic strength of the HA solution, which is helpful for avoiding the formation of aggregates of the capsules with counter-charged polymers. The solutions (2 mg/mL in water) of FITC-dextran with various molecular weights were mixed with the HA-treated hollow hydrogels. After 30 min, each mixture was examined with CLSM. In order to test the permeability of the capsules with respect to a small molecule, fluorescein sodium salt solution (2 mg/mL) was used.

Example 4. Synthesis of Au Nanoparticles within the Hydrogel Shell Phases

The Au nanoparticles (NPs) were synthesized within the hydrogel shell phases by following the procedure reported by Kozlovskaya, V. et al., *Chem. Mater.* 2009, 21, 2158-2167. First, 100 μL capsule suspensions (~10% w/v in water) were treated with various amounts of GA. After GA treatment, the solutions were washed three times with a borate buffer at pH 10 and mixed with 2 mL of 2 mM HAuCL$_4$ solution in 0.1 M borate buffer (pH 10) for 5 days in the dark. After the reaction, all suspensions were cleaned by repeated centrifugation with water. The effects of the hybridization of Au NPs with the shells of the hollow hydrogel capsules were evaluated by performing UV-visible spectroscopy measurements in a quartz cell with a 10 mm optical path by using a Cary 100 spectrophotometer (Varian). The Au NPs were examined with transmission electron microscopy (JEM-2100F HR, Jeol Ltd., Japan).

Example 5. Optically Induced Rupture of the Au NP/PVAm Composite Capsules

A Q-switched Nd:YAG laser beam (Continuum Inc., USA, 532 nm) with varying radiant exposure was employed as the laser source. In order to observe the response to multiple laser pulses, the dispersion of hydrogel capsules loaded with Au NPs was irradiated in a standard quartz cuvette for 1 mM with a 10 Hz series of 8 ns laser pulses. The laser was operated at a high pump power (400 mJ per pulse IR output) to achieve a homogeneous top hat, and the multimode laser profile was attenuated to the lower energies required by using an adjustable polarizing beam splitter to keep the beam profile constant in all experiments. After irradiation, the rupture of capsule structure was investigated with a scanning electron microscope (Hitachi S-4300, Japan).

Example 6. Results and Discussion

Although various mechanistic theories are given herein to explain certain data, embodiments of the present invention are not limited to any particular mechanism of operation.

Example 6a. Synthesis and Characterization of Hollow Hydrogel Capsules

An example of a synthetic process for the fabrication of hollow hydrogel capsules is illustrated in Scheme 1.

Scheme 1

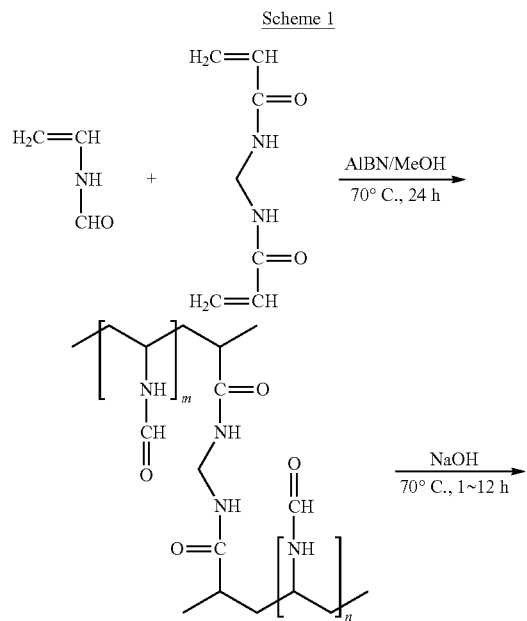

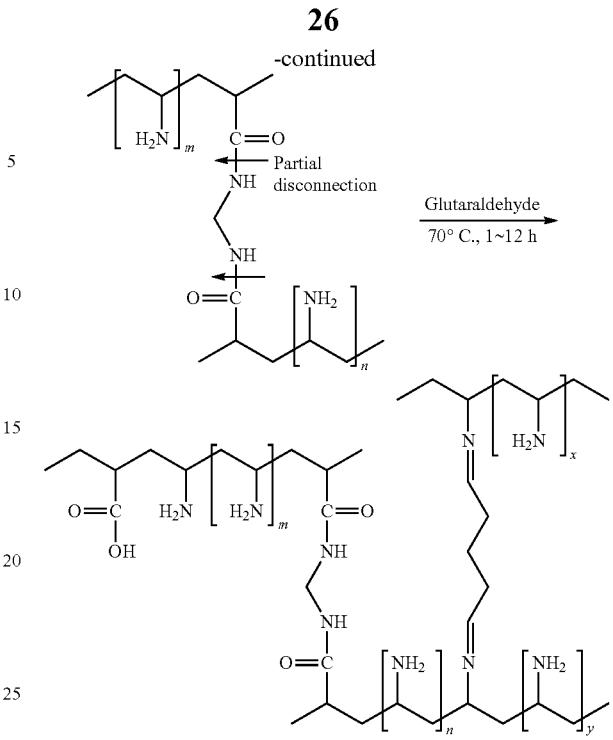

The first step of the reaction can include carrying out the dispersion polymerization of NVF as a main monomer and MBA as a cross-linking agent. PNVF particles were precipitated during the polymerization at least in part due to the decrease in solubility of the growing chains in methanol. After synthesis of PNVF particles, their sequential hydrolysis and cross-linking reaction led to the generation of monodisperse micrometer-sized hollow PVAm hydrogel capsules. Both the hydrolysis of vinylformamide to vinylamine and the some breakage of amide bonds between NVF and MBA, which then allows the cleaved PVAm chains to diffuse out of the particles, were helpful for the generation of hollow capsule structure without using templates. The hydrolysis of vinylformamide was performed under strong basic conditions, and then the crosslinking reaction with GA was followed stepwise. The stepwise or separate hydrolysis and cross-linking yields a structure similar to that resulting from the one-shot reaction (FIG. 1), providing evidence that the cross-linked PVAm chains that are not entirely cleaved by hydrolysis are sequentially cross-linked by GA between amine groups at the periphery of PVAm particles. Hydrogel shells can be automatically generated at the periphery of colloidal particles; the inward diffusion of GA from the continuous phase is more favorable than the release of cleaved PVAm species, typically with much higher molecular weights. After the shell cross-linking, the diffusion of cleaved PVAm species out of the particles is significantly hindered but eventually they are replaced with water, resulting in the formation of substantially water-filled single cores.

Figure 1B:
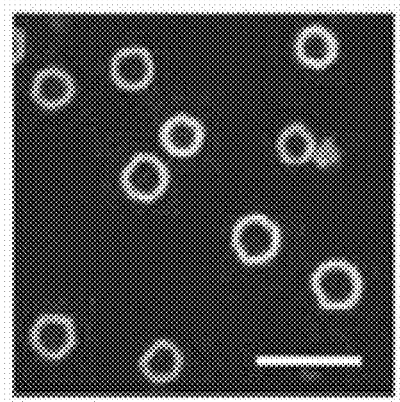
FIG. 1b illustrates a CLSM image of hollow hydrogel capsules prepared after the stepwise hydrolysis followed by cross-linking, in accordance with various embodiments.
Figure 1C:
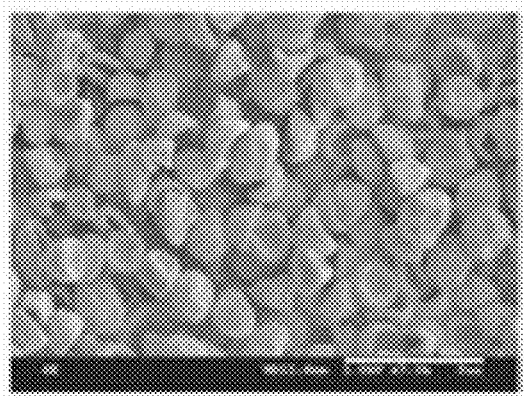
FIG. 1c illustrates a SEM image of the hollow hydrogel capsules shown in panel FIG. 1a, after lyophilization, in accordance with various embodiments.
Figure 1D:
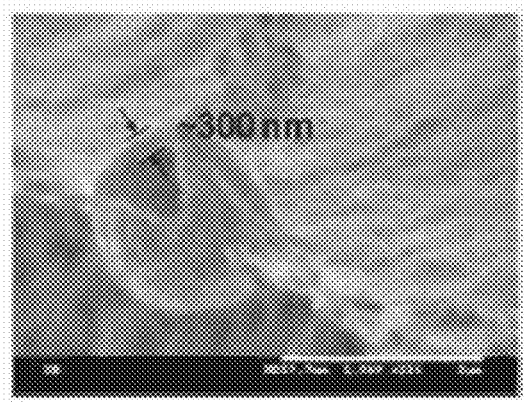
FIG. 1d illustrates a cryo-SEM image of a freeze-fractured hollow hydrogel capsule prepared from 0.1 mol GA treatment, in accordance with various embodiments.

FIG. 1a shows a CLSM image of hollow PVAm hydrogel capsules after in situ hydrolysis and cross-linking (with 2 N NaOH and 0.05 mol GA for 12 h at 70° C.). FIG. 1b shows a CLSM image of hollow hydrogel capsules prepared after the stepwise hydrolysis (with 2 N NaOH for 12 h at 70° C.) followed by cross-linking (with 0.1 mol GA for 8 h at 70° C.). In order to image the shell phase, amine groups attached to the polymer chains were labeled with FITC. FIG. 1c shows a SEM image of hollow hydrogel capsules, shown in FIG. 1a, after lyophilization. FIG. 1d shows a cryo-SEM image of a freeze-fractured hollow hydrogel capsule prepared from 0.1 mol GA treatment. The scale bars in FIGS. 1a to 1c are 5 μm and the scale bar in FIG. 1d is 2 μm.

Figure 2A:
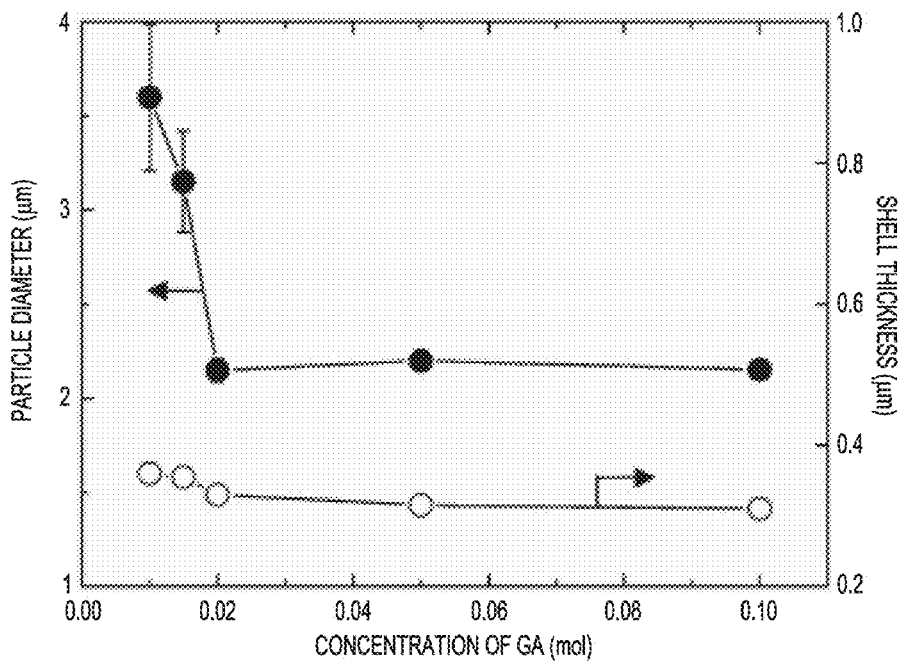
FIG. 2a illustrates Particle size and shell thickness as a function of GA concentration, in accordance with various embodiments.
Figure 2B:
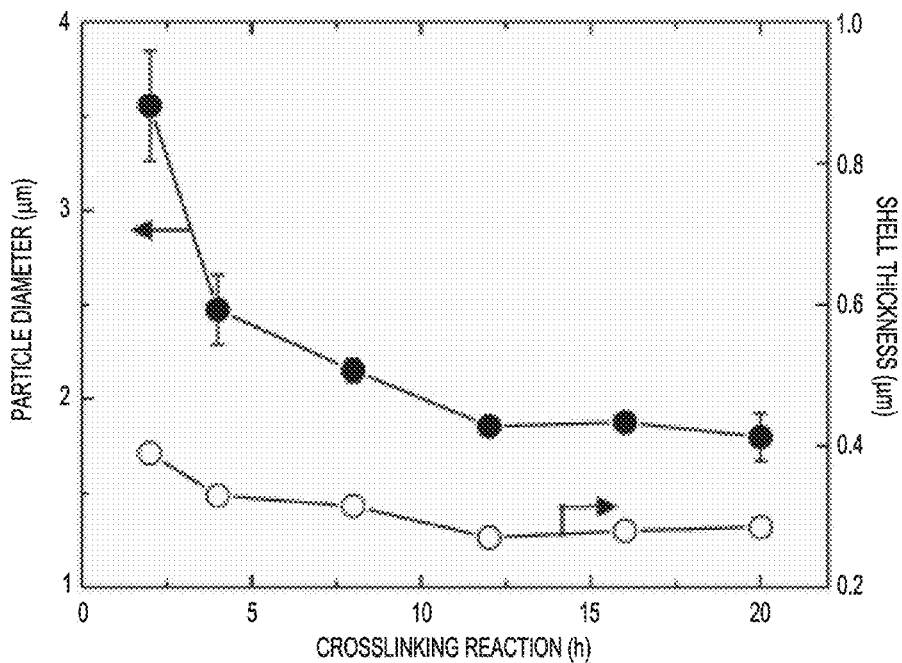
FIG. 2b illustrates changes in both particle size and shell thickness plotted against cross-linking reaction time, in accordance with various embodiments.
Figures 3A, 3B, 3C:
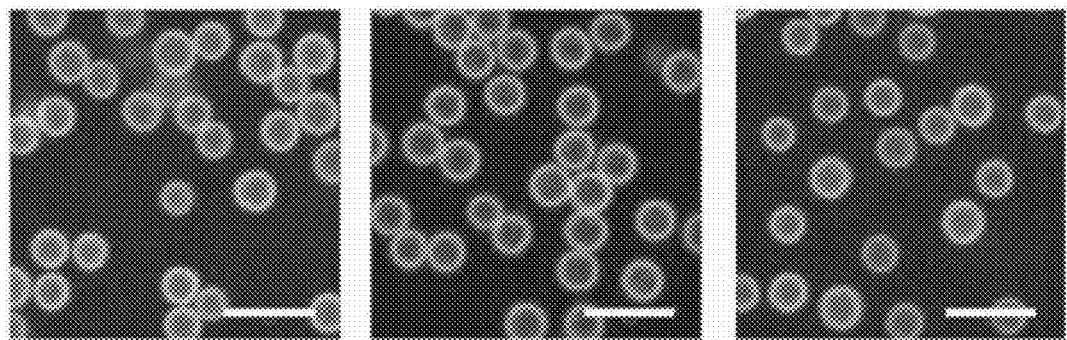
FIGS. 3a-e illustrate CLSM images of hollow hydrogel capsules prepared with different concentrations of GA, in accordance with various embodiments: (a) 0.1 mol; (b) 0.05 mol; (c) 0.02 mol; (d) 0.015 mol; (e) 0.01 mol.
Figures 3D, 3E:
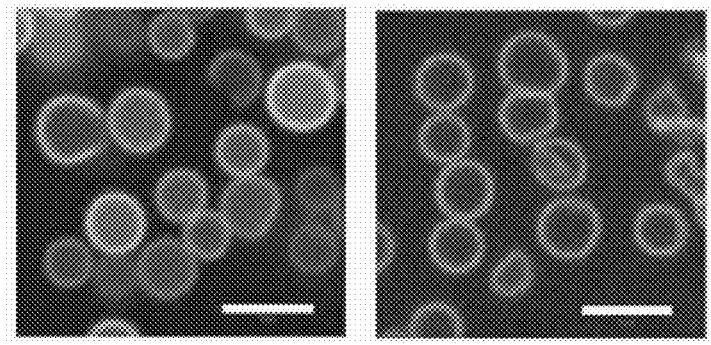
Figure 4A:
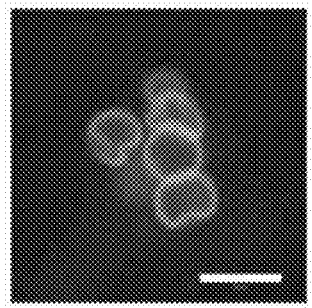
FIGS. 4a-f illustrate CLSM images of hollow hydrogel capsules as a function of crosslinking reaction time, in accordance with various embodiments: (a) 2 h; (b) 4 h; (c) 8 h; (d) 12 h; (e) 16 h; (f) 20 h.
Figure 4B:
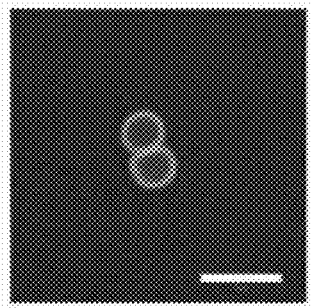
Figure 4C:
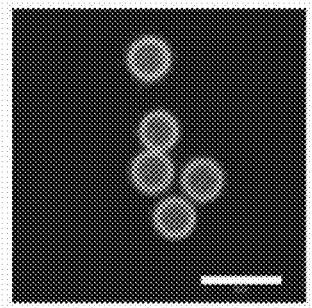
Figure 4D:
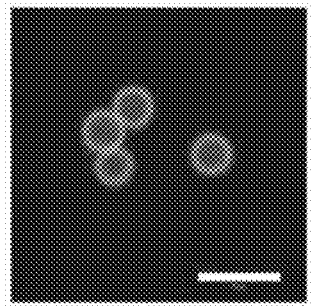
Figure 4E:
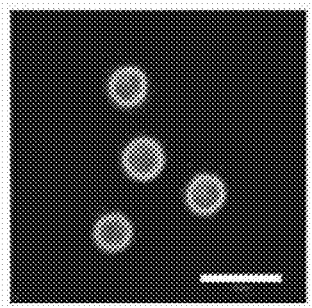
Figure 4F:
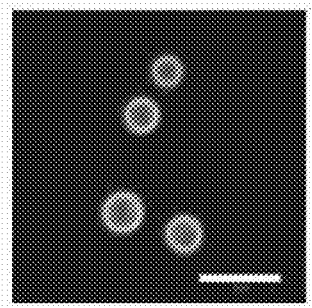
Figure 8A:
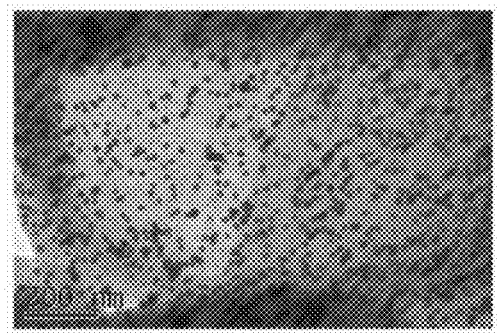
FIGS. 8a-d illustrate Au NPs synthesized using different concentrations of GA, in accordance with various embodiments: (a) 0.015 mol; (b) 0.02 mol; (c) 0.05 mol; (d) 0.1 mol.
Figure 8B:
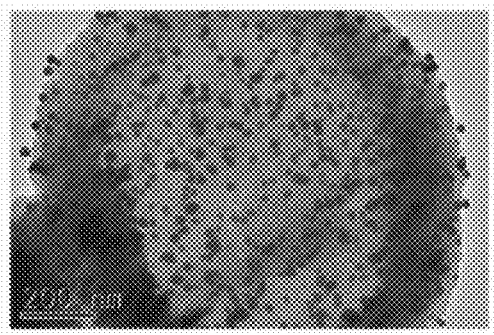
Figure 8C:
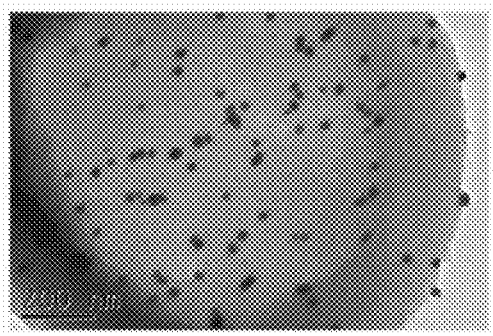
Figure 8D:
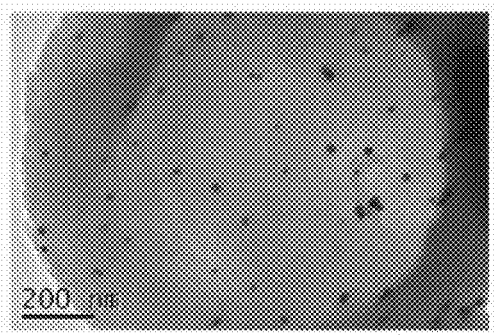

Variation of cross-linking density of hydrogels can change their physical properties, such as stiffness, swelling ratio, mesh size, and permeability. In order to study the effect of shell cross-linking on particle morphology, hollow hydrogel capsules were prepared by varying the concentration of GA, which acts as a cross-linker FIG. 2 shows the change of particle diameter and shell thickness of hollow hydrogel capsules as a function of GA concentration as well as reaction time. In this Example, the particle size decreased with the increases in GA concentration up to 0.02 mol and then remained almost unchanged beyond that GA concentration (FIG. 2a). However, the shell thickness of hollow capsules was affected only slightly by the variation in GA concentration. FIG. 2b shows that the average diameter and shell thickness of hollow hydrogel capsules gradually decrease as the cross-linking reaction time is increased. These results evidence that the degree of hydrolysis of formamide groups can regulates the degree of shell cross-linking and affect the capsule size.

FIG. 2a shows particle size and shell thickness as a function of GA concentration (with 2 N NaOH for 12 h). FIG. 2b shows changes in both particle size and shell thickness plotted against cross-linking reaction time (with 2 N NaOH and 0.1 mol GA). The particle diameter and shell thickness were determined from the analysis of CLSM images.

The shell thickness of the capsules was obtained by analyzing the CLSM images of hollow hydrogel capsules prepared (see, FIGS. 3a-e, showing CLSM images of hollow hydrogel capsules prepared with different concentrations of GA: (a) 0.1 mol; (b) 0.05 mol; (c) 0.02 mol; (d) 0.015 mol; (e) 0.01 mol. The hydrolysis and crosslinking reactions were performed using 2 N NaOH for 12 h at 70° C. The scale bars in the figures are 5 μm. Also see FIGS. 4a-f, showing CLSM images of hollow hydrogel capsules as a function of cross-linking reaction time: (a) 2 h; (b) 4 h; (c) 8 h; (d) 12 h; (e) 16 h; (f) 20 h. The hydrolysis and crosslinking reactions were performed using 2 N NaOH and 0.1 mol glutaraldehyde at 70° C. The scale bars in the figure are 5 μm). The diffraction limit may limit the ability to resolve the particle images in hundreds of nanometer length scales due; thus, the shell thickness was measured again by employing another analysis method, the freeze-fracture SEM. To effectively immobilize the capsules in the aqueous continuous phase, the capsule dispersion was fixed in an agar gel (2 wt %). The agar gel was then freeze-fractured. It has observed from the freeze-fracture SEM that the shell thickness of the sliced hollow capsules ranges from 250 to 350 nm (FIG. 1d), showing that the determination of shell thickness with CLSM analysis was substantially accurate.

Example 6b. Control of the Permeability of Hollow Hydrogel Capsules

The diffusions through the hydrogel shells of FITC-labeled dextran polymers with different hydrodynamic diameters ranging from approximately 4 to 32 nm based on different molecular weights were examined with the CLSM analysis. It was observed that most FITC-dextran molecules deposit within and on the shell of hydrogel capsules, leading to labeling of the shell layer. FITC-dextran molecules were even detected in the water filled cores of shell particles. However, their concentration was relatively lower compared with that in the shell layer. While imaging the particles with CLSM, the fluorescence intensity was tuned. The hydrogel shells were permeable to FITC-tagged dextran up to a molecular weight of 250 kDa while FITC-labeled dextrans with a molecular weight of 500 kDa did not penetrate the hydrogel shell phase and were in some cases trapped in the shell phase. (see, FIG. 5, showing permeation of FITC-labeled dextran through the shell phases crosslinked with (a) 0.015 mol GA and (b) 0.1 mol GA. Numbers in the images are the average molecular weight of FITC-labeled dextran. In all the cases shown, the permeation time was fixed at 0.5 h. The scale bars are 5 μm.) This result evidences that the crosslinking density of the PVAm shell phase of hollow capsules can be controlled to some extent by varying GA cross-linker concentration, but the size of the pores/mesh formed between cross-linking points is sufficiently large to allow the facile permeation of FITC-labeled dextran polymers up to between 250 kDa and 500 kDa molecular weight.

The ability of particular sizes of molecules to permeate through the hydrogel shell phase can be modulated by treating the PVAm shells with negatively charged polymers, such as HA. This post-treatment rendered the hydrogel shell phase impermeable even to FITC-tagged dextran with a molecular weight of 4 kDa. (see, FIG. 6, which shows the permeation of FITC-labeled dextran through the hydrogel shell phases cross-linked with 0.015 mol GA followed by the posttreatment with 250 KDa HA. The numbers in the images denote the average molecular weight of FITC-labeled dextran. In all the cases shown, the permeation time was fixed at 0.5 h. All the scale bars are 5 μm.) After the treatment with HA, all the FITC-dextran chains tested were accumulated on the shell surface, and there was no detectible permeation even with small dye molecules. (See, FIG. 7, showing permeability of a low molecular weight anionic dye (fluorescein sodium) through a hydrogel shell phase treated with HA: (a) 0.05 mol GA without HA treatment 5 min after incubation, (b) 0.015 mol GA followed by the treatment with 250 kDa HA, and (c) 0.015 mol GA followed by the treatment with 1.45 MDa HA 60 min after incubation. The scale bars are 5 μm.) Treatment with HA of different molecular weights can block interstitial spaces between cross-links at least in part due to favorable electrostatic interactions between positively charged amine groups within the capsules and negatively charged HAs, or due to covalent bonds formed by condensation reactions between carboxylic acid groups on the HAs and the primary amine groups.

Example 6c. Formation of Au NPs within Hydrogel Shells $HAuCl_4$ precursors dissolved in a borate buffer (pH 10) were reduced within the PVAm shell phase to form Au NPs. The degree of crosslinking in the shell phase affected the number density of Au NPs formed. In a highly cross-linked hydrogel shell, relatively large Au NPs (20.3±4.3 nm in diameter) were produced in a lower population, whereas, in a slightly crosslinked hydrogel shell, much smaller Au NPs (4±1.2 nm) were prepared with a higher number density. (see, FIG. 8, showing incorporation of Au NPs within the hydrogel shell phases. Au NPs were synthesized for 5 days in the presence of 2 mL of 2 mM $HAuCl_4$ solution in 0.1 M borate buffer (pH 10) and 100 μL of hydrogel capsules dispersed in 0.1 M borate buffer (pH 10), which were treated with different GA concentrations: (a) 0.015 mol; (b) 0.02 mol; (c) 0.05 mol; (d) 0.1 mol.) Thus, both the size of Au NPs and their number density within PVAm matrices can be tuned by varying the degree of cross-linking of the shell phase. The degree of cross-linking in the shell phase is directly proportional to the GA cross-linker concentration because PVAm chains were cross-linked by the removal of amine groups. Consequently, hydrogel networks with higher degree of cross-linking have less amine groups, implying that there is much less reduction site for the formation of Au NPs as well as much more spatial hindrance. Hence, hydrogel networks with lower degrees of cross-linking in the hydrogel shell phases facilitate the formation of Au NPs within PVAm meshes. Other experimental factors, such as reaction time and Au precursor concentration, also affect the formation of Au NPs, in accordance with general synthetic rules. (see, FIG. 9, showing Incorporation of Au NPs within the hydrogel shell phases. Au NPs were synthesized for 2 days in the presence of 100 µL of 0.015 mol GA treated hydrogel capsules and 2 mL of different concentration of $HAuCl_4$ solution in 0.1 M borate buffer (pH 10): (a, b) 2 mM; (c, d) 10 mM; (e, f) 50 mM. The images of (b), (d), and (f) show the high magnification for those of (a), (c), and (e), respectively.)

Figure 10:
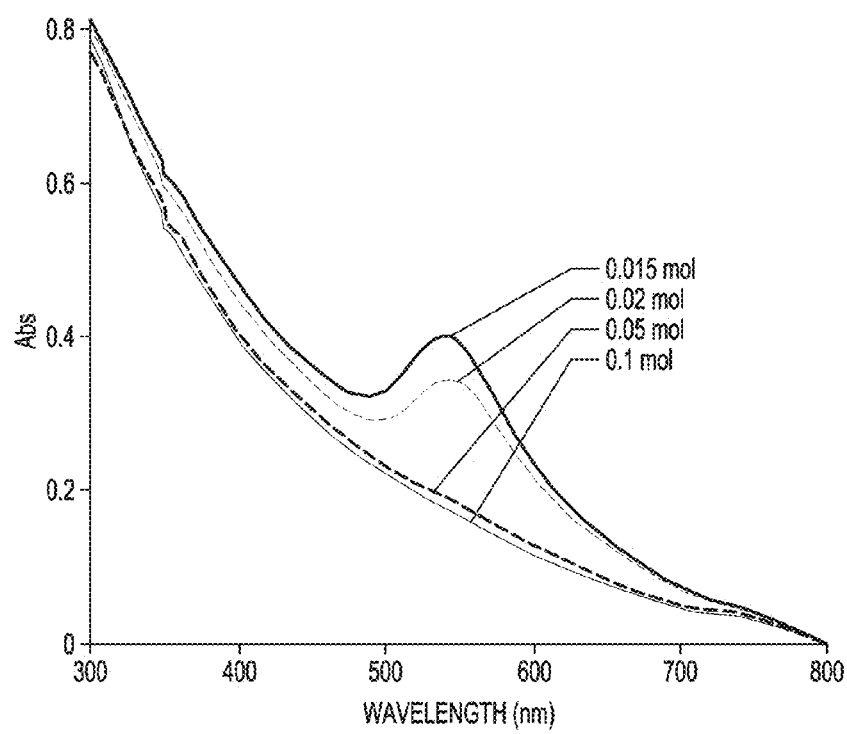
FIG. 10 illustrates UV-visible spectra of Au NP/PVAm composite capsules prepared with different GA concentrations, in accordance with various embodiments.
Figure 11:
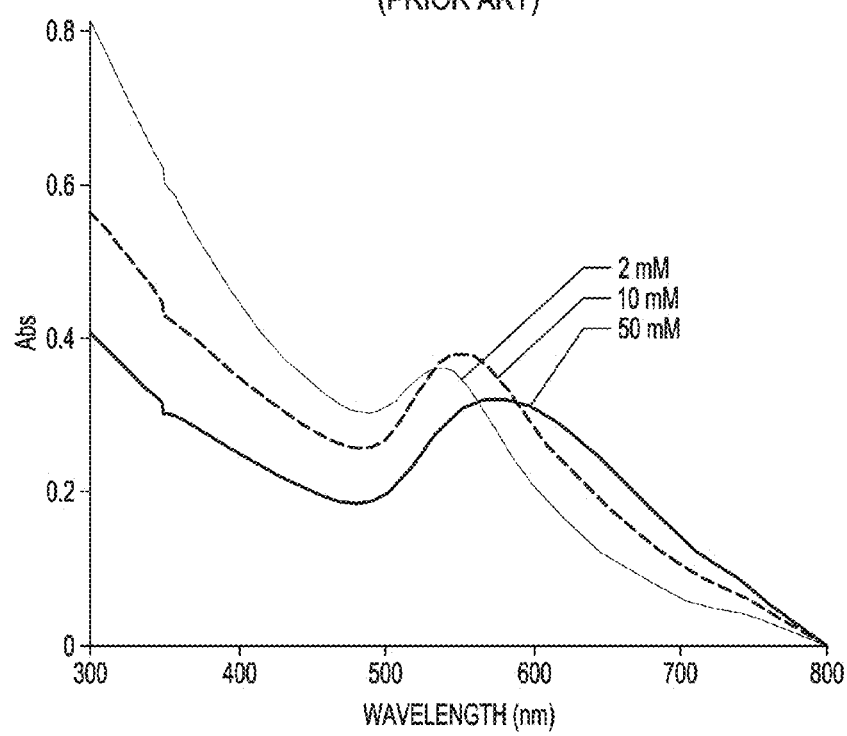
FIG. 11 illustrates UV-visible spectra of Au NP/poly (vinylamine) composite capsules prepared with different $HAuCl_4$ concentrations, in accordance with various embodiments.

By varying the size of Au NPs in the hydrogel shells, vibrant colors, caused at least in part by the surface plasmon resonance (SPR) absorption, were obtained. As shown in FIG. 10, Au NP/PVAm composite shell phases prepared with different GA cross-linker concentrations exhibited absorbance peaks around 540 nm due at least in part to the SPR effect of Au NPs prepared. FIG. 5 shows the UV-visible spectra of Au NP/PVAm composite capsules prepared with different GA concentrations, the numbers of which are shown in the figure. The increase in the intensity of absorbance may arise from the increase in the number density of Au NPs in accordance with the decrease in GA concentration or the decrease in crosslinking density. The change in the mixing ratio of Au precursor and hydrogel shell capsules shifts the maximum absorption peak from 538 to 573 nm. This red-shift of the SPR peak can originate from the aggregation of Au NPs within confined hydrogel shell phases. (see, FIG. 11 showing a UV-vis spectrum of Au NP/poly(vinylamine) composite capsules prepared for 2 days in the presence of 100 µL of 0.015 mol GA-treated hydrogel capsules and 2 mL of different concentration of $HAuCl_4$ solution at pH 10.)

Example 6d. Laser-Induced Rupture of Au/PVAm Composite Shell Phases

Figure 12A:
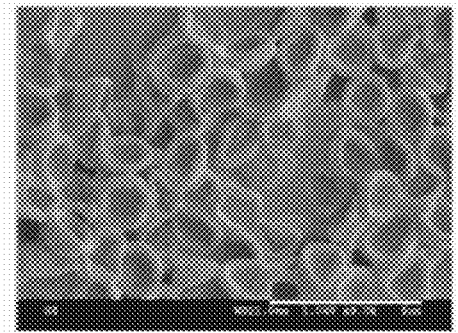
FIG. 12a illustrate SEM images of Au NP/PVAm composite capsules before irradiation, in accordance with various embodiments.
Figure 12B:
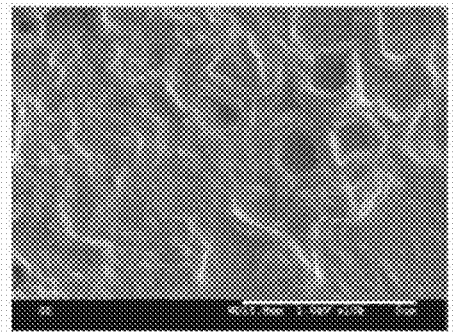
FIG. 12b illustrate SEM images of Au NP/PVAm composite capsules after strong radiant exposure of 200 $mJ/cm^2$, in accordance with various embodiments.
Figure 13A:
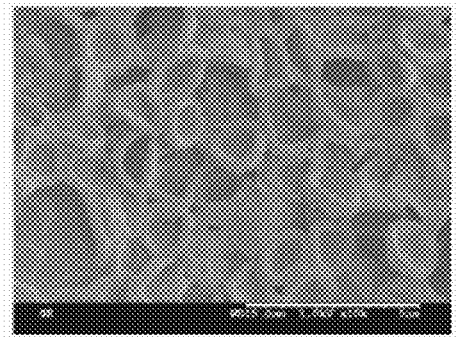
FIG. 13a illustrates SEM images of Au NP/PVAm composite capsules after weak radiant exposure (50 $mJ/cm^2$), in accordance with various embodiments.
Figure 13B:
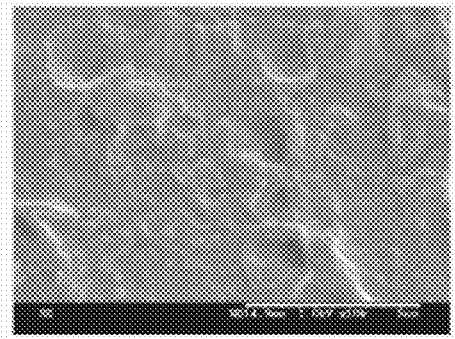
FIG. 13b illustrates SEM images of Au NP/PVAm composite capsules after moderate radiant exposure (100 $mJ/cm^2$), in accordance with various embodiments.
Figure 14A:
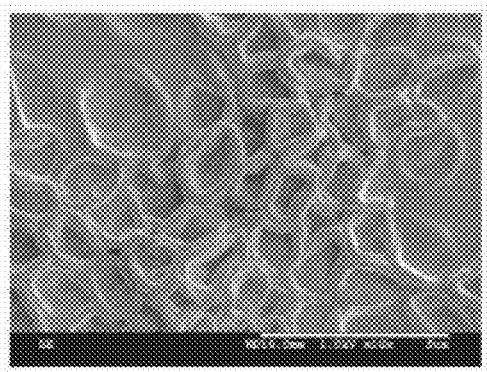
FIGS. 14a-d illustrate SEM images of Au NP/PVAm composite capsules prepared from 0.02 mol GA treated capsules and different concentrations of gold precursors after irradiation, in accordance with various embodiments: (a) no gold precursor; (b) 2 mM $HAuCl_4$; (c) 10 mM $HAuCl_4$; (d) 50 mM $HAuCl_4$.
Figure 14B:
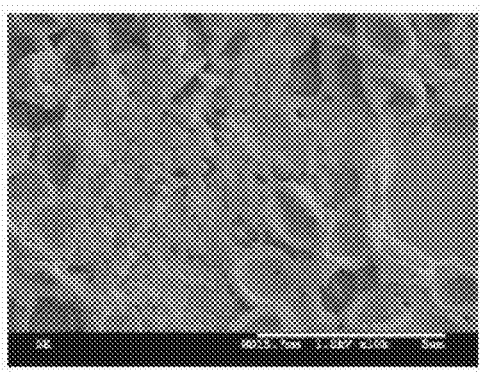
Figure 14C:
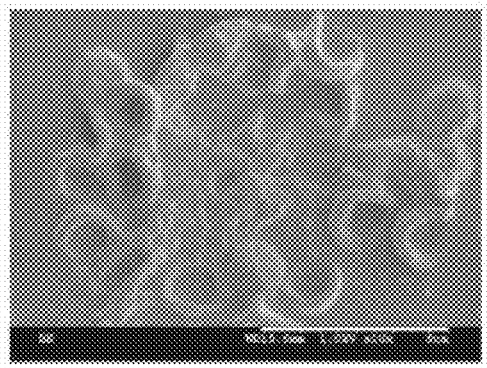
Figure 14D:
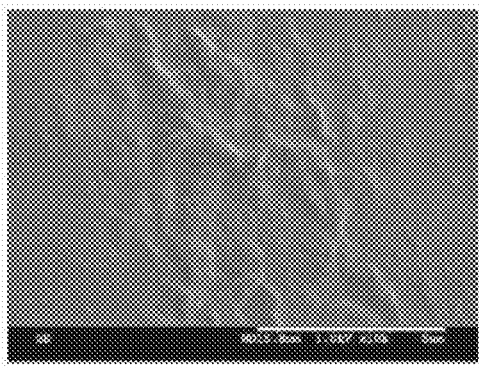

In order to investigate the response of Au NP/PVAm composite shell phases to light triggers, those hydrogel capsules were subject to irradiation at 532 nm with a Q-switched Nd:YAG laser beam. After irradiation with multiple laser pulses, those hydrogel capsules were examined with SEM. The results are shown in FIGS. 12a-b, which shows the rupture of Au NP/PVAm composite capsules after irradiation with 8 ns Nd:YAG laser pulses at 532 nm for 1 mM at a frequency of 10 Hz. The Au NP/PVAm composite capsules were prepared with 0.02 mol GA-treated hydrogel capsules and 50 mM $HAuCl_4$ solution. SEM images of composite capsules (a) before irradiation and (b) after strong radiant exposure of 200 $mJ/cm^2$. Scale bar is 5 µm. In the absence of laser irradiation, the hollow composite capsules retain their original shape, which typically take the shape of deflated balloons in dried state. After exposure to weak irradiation (50 $mJ/cm^2$), the outlines of individual capsules can be still identified, but most of their surfaces seem to be slightly degraded. (See, FIGS. 13a-b, showing rupture of Au NP/PVAm composite capsules after the irradiation with 8 ns Nd:YAG laser pulses at 532 nm for 1 mM at a frequency of 10 Hz. The Au NP/PVAm composite capsules were prepared with 0.02 mol GA-treated hydrogel capsules and 50 mM $HAuCl_4$ solution. SEM images of composite capsules: (a) after weak radiant exposure (50 $mJ/cm^2$); (b) after moderate radiant exposure (100 $mJ/cm^2$). Scale bars are 5 µm.) However, further exposure to higher irradiation (higher than 100 $mJ/cm^2$) completely ruptures the shell phases, and individual capsules are no longer distinguishable. The laser-induced rupture of Au NP/PVAm composite shell phases was dependent on the number density of Au NPs. (FIGS. 14a-d, showing SEM images of Au NP/PVAm composite capsules prepared from 0.02 mol GA treated capsules and different concentrations of gold precursors after the radiant exposure of 200 $mJ/cm^2$: (a) no gold precursor; (b) 2 mM $HAuCl_4$; (c) 10 mM $HAuCl_4$; (d) 50 mM $HAuCl_4$. Au NP/PVAm composite capsules were irradiated with 8 Hz series of 8 ns Nd:YAG laser (532 nm) pulses for 1 mM at a frequency of 10 Hz. The scale bars in the figures are 5 µm.) These results evidence that Au NPs embedded in the hydrogel shell phases undergo photofragmentation and photofusion upon exposure to laser irradiation, which can heat the composite shells above the spinodal point of water. The composite shell phases are composed of a number of materials with very different thermal expansion coefficients, thus the local heating can create significant thermal stresses within the shell phases and ultimately can result in the rupture of complete shells.

Example 6e. Conclusions

In summary, uniform-sized hollow hydrogel capsules were prepared via in situ hydrolysis and cross-linking of micrometer-sized PNVF particles without resorting to template approach. Changes in the permeability of hydrogel capsules can be achieved through the modification of the surfaces of the capsules with compounds such as HA. Furthermore, Au NPs can be incorporated within the hydrogel shell phases, which can provides a means to rupture the shells by irradiating them with a laser.

The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those of ordinary skill in the art, and that such modifications and variations are considered to be within the scope of this invention as defined by the appended claims.

ADDITIONAL EMBODIMENTS

The present invention provides for the following exemplary embodiments, the numbering of which is not to be construed as designating levels of importance:

Embodiment 1 provides a method of treating a subterranean formation, the method comprising: obtaining or providing one or more of the hollow hydrogel capsules of any one of Embodiments 34-95; and contacting the hollow hydrogel capsules with a subterranean material downhole.

Embodiment 2 provides the method of Embodiment 1, further comprising releasing downhole at least some or substantially all of the at least one component of the downhole composition in the hollow interior of the capsule.

Embodiment 3 provides the method of Embodiment 2, wherein the releasing is localized to one or more specific regions downhole.

Embodiment 4 provides the method of any one of Embodiments 1-3, further comprising triggering the release of at least some of the at least one component of the downhole composition in the hollow interior of at least some of the hollow hydrogel capsules.

Embodiment 5 provides the method of Embodiment 4, wherein the triggering occurs downhole.

Embodiment 6 provides the method of any one of Embodiments 4-5, wherein the triggering comprises acid-triggered, caustic material-triggered, heat-triggered, light-triggered, radiation-triggered, chemically-triggered, natural decay-triggered, vibration-triggered, acoustic-triggered, agitation-triggered, or a combination thereof.

Embodiment 7 provides the method of any one of Embodiments 4-6, wherein the triggering comprises triggering a gradual release of at least some of the at least one component of the downhole composition in the hollow interior of at least some of the hollow hydrogel capsules.

Embodiment 8 provides the method of any one of Embodiments 4-7, wherein the triggering comprises triggering a fast release of substantially all of the at least one component of the downhole composition in the hollow interior of at least some of the hollow hydrogel capsules.

Embodiment 9 provides the method of any one of Embodiments 4-8, wherein the triggering comprises an acid or caustic material reacting with the hydrogel capsule walls thereby increasing the permeability thereof, wherein the acid or caustic material is at least one of within and outside of the hollow hydrogel capsule.

Embodiment 10 provides the method of any one of Embodiments 4-9, wherein the triggering comprises heating the hydrogel capsule.

Embodiment 11 provides the method of Embodiment 10, wherein the heating occurs within the capsule, the heating occurs at least one of in and on the hydrogel shell of the capsule, the heating occurs outside the hydrogel shell of the capsule, or a combination thereof.

Embodiment 12 provides the method of Embodiment 11, wherein the heating occurs within the capsule due at least in part to a chemical reaction of materials therein.

Embodiment 13 provides the method of any one of Embodiments 11-12, wherein the heating is at least in part caused by heating of metal nanoparticles, wherein the metal nanoparticles are in the hydrogel shell of the capsule, on the hydrogel shell of the capsule, or a combination thereof.

Embodiment 14 provides the method of any one of Embodiments 4-13, wherein the triggering comprises applying radiation to the hydrogel capsule.

Embodiment 15 provides the method of Embodiment 14, wherein the radiation comprises light.

Embodiment 16 provides the method of Embodiment 15, wherein the radiation comprises laser light.

Embodiment 17 provides the method of any one of Embodiments 14-16, wherein the radiation causes heating of metal nanoparticles, wherein the metal nanoparticles are in the hydrogel shell of the capsule, on the hydrogel shell of the capsule, or a combination thereof.

Embodiment 18 provides the method of any one of Embodiments 4-17, wherein the triggering comprises a chemical reaction that increases the permeability of the hydrogel shell, wherein the chemical reaction occurs within the capsule, outside of the capsule, or a combination thereof.

Embodiment 19 provides the method of Embodiment 18, wherein the chemical reaction produces at least one of heat and a material that reacts with the hydrogel shell thereby increasing the permeability thereof.

Embodiment 20 provides the method of any one of Embodiments 4-19, wherein the triggering comprises vibrating or agitating the hydrogel capsules thereby increasing the permeability thereof.

Embodiment 21 provides the method of Embodiment 20, wherein the permeability is increased at least due to rupturing the hydrogel shell, tearing the hydrogel shell, puncturing the hydrogel shell, or a combination thereof.

Embodiment 22 provides the method of any one of Embodiments 1-21, wherein obtaining or providing the hollow hydrogel capsules comprises obtaining or providing a composition comprising the hollow hydrogel capsules, and wherein contacting the hollow hydrogel capsules with the subterranean material downhole comprises contacting the composition comprising the hydrogel capsules with the subterranean material downhole.

Embodiment 23 provides the method of Embodiment 22, wherein the composition comprising the hollow hydrogel capsules comprises a downhole composition for subterranean petroleum or water well drilling, stimulation, clean-up, production, completion, abandonment, or a combination thereof.

Embodiment 24 provides the method of Embodiment 23, wherein the downhole composition for subterranean petroleum or water well drilling, stimulation, clean-up, production, completion, abandonment, or a combination thereof comprises at least one of a drilling fluid, stimulation fluid, fracking fluid, spotting fluid, clean-up fluid, production fluid, completion fluid, remedial treatment fluid, abandonment fluid, pill, acidizing fluid, cementing fluid, or a combination thereof.

Embodiment 25 provides the method of Embodiment 24, wherein the method is a method of reducing viscosity downhole of the drilling fluid, stimulation fluid, fracking fluid, spotting fluid, clean-up fluid, production fluid, completion fluid, remedial treatment fluid, abandonment fluid, pill, acidizing fluid, cementing fluid, or a combination thereof, of increasing dispersion downhole of one medium in another medium, or a combination thereof; and wherein the at least one component of the downhole composition in the hollow interior of the one or more hollow hydrogel capsules comprises a breaker, a surfactant, a dispersant, a diluent, or a combination thereof.

Embodiment 26 provides the method of any one of Embodiments 24-25, wherein the method is a method of increasing viscosity downhole of the drilling fluid, stimulation fluid, fracking fluid, spotting fluid, clean-up fluid, production fluid, completion fluid, remedial treatment fluid, abandonment fluid, pill, acidizing fluid, cementing fluid, or a combination thereof; and wherein the at least one component of the downhole composition in the hollow interior of the one or more hollow hydrogel capsules comprises a crosslinker.

Embodiment 27 provides the method of any one of Embodiments 24-26, wherein the method is a method of forming a cement downhole having increased porosity or modifying the density downhole of the drilling fluid, stimulation fluid, fracking fluid, spotting fluid, clean-up fluid, production fluid, completion fluid, remedial treatment fluid, abandonment fluid, pill, acidizing fluid, cementing fluid, or a combination thereof; and wherein the at least one component of the downhole composition in the hollow interior of the one or more hollow hydrogel capsules comprises a gas.

Embodiment 28 provides the method of any one of Embodiments 24-27, wherein the method is a method of modifying viscosity downhole of the drilling fluid, stimulation fluid, fracking fluid, spotting fluid, clean-up fluid, production fluid, completion fluid, remedial treatment fluid, abandonment fluid, pill, acidizing fluid, cementing fluid, or a combination thereof; and wherein the at least one component of the downhole composition in the hollow interior of the one or more hollow hydrogel capsules comprises a viscosity modifier.

Embodiment 29 provides the method of any one of Embodiments 24-28, wherein the method is a method of modifying density downhole of the drilling fluid, stimulation fluid, fracking fluid, spotting fluid, clean-up fluid, production fluid, completion fluid, remedial treatment fluid, abandonment fluid, pill, acidizing fluid, cementing fluid, or a combination thereof; and wherein the at least one component of the downhole composition in the hollow interior of the one or more hollow hydrogel capsules comprises a density control agent.

Embodiment 30 provides the method of any one of Embodiments 24-29, wherein the method is a method of adding pigment, dye, or marker downhole to the drilling fluid, stimulation fluid, fracking fluid, spotting fluid, clean-up fluid, production fluid, completion fluid, remedial treatment fluid, abandonment fluid, pill, acidizing fluid, cementing fluid, the subterranean material, or a combination thereof; and wherein the at least one component of the downhole composition in the hollow interior of the one or more hollow hydrogel capsules comprises at least one of a pigment, dye, marker.

Embodiment 31 provides the method of any one of Embodiments 24-30, wherein the method is a method of accelerating curing downhole of cement or resin; wherein the composition comprising the hollow hydrogel capsules comprises a resin or an aqueous mixture comprising cement, cement kiln dust, or a combination thereof; and wherein the at least one component of the downhole composition in the hollow interior of the one or more hollow hydrogel capsules comprises a curing accelerator.

Embodiment 32 provides the method of any one of Embodiments 24-31, wherein the method is a method for retarding curing downhole of cement or resin; wherein the composition comprising the hollow hydrogel capsules comprises a resin or an aqueous mixture comprising cement, cement kiln dust, or a combination thereof; and wherein the at least one component of the downhole composition in the hollow interior of the one or more hollow hydrogel capsules comprises a curing retarder.

Embodiment 33 provides the method of any one of any one of Embodiments 25-32, wherein the at least one component of the downhole composition in the hollow interior of the one of more hollow hydrogel capsules is at least partially released downhole.

Embodiment 34 provides a hollow hydrogel capsule for treatment of a subterranean formation comprising: a hydrogel shell comprising a hydrolyzed and crosslinked polymerized composition, the pre-polymerized composition comprising at least one vinyl amine comprising at least one hydrolytically deprotectable masked primary amine, and at least one polyvinyl compound; and a hollow interior comprising at least one component of a downhole composition for subterranean petroleum or water well drilling, stimulation, clean-up, production, completion, abandonment, or a combination thereof; wherein the crosslinking comprises crosslinking with at least one molecule comprising a plurality of functional groups condensable with primary amines.

Embodiment 35 provides the hollow hydrogel capsule of Embodiment 34, wherein the composition for subterranean petroleum or water well drilling, stimulation, clean-up, production, completion, abandonment, or a combination thereof comprises a drilling fluid, stimulation fluid, hacking fluid, spotting fluid, clean-up fluid, production fluid, completion fluid, remedial treatment fluid, abandonment fluid, pill, acidizing fluid, cementing fluid, or a combination thereof.

Embodiment 36 provides the hollow hydrogel capsule of Embodiment 34, wherein the interior of the capsule comprises water, saline, salt, aqueous base, oil, organic solvent, synthetic fluid oil phase, aqueous solution, alcohol or polyol, cellulose, starch, alkalinity control agent, density control agent, density modifier, surfactant, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, rheology modifier, oil-wetting agent, set retarding additive, surfactant, gas, accelerator, weight reducing additive, heavyweight additive, lost circulation material, filtration control additive, dispersant, salts, fiber, thixotropic additive, breaker, crosslinker, gas, rheology modifier, density control agent, curing accelerator, curing retarder, pH modifier, chelating agent, scale inhibitor, enzyme, resin, water control material, polymer, oxidizer, a marker, or a combination thereof.

Embodiment 37 provides the hollow hydrogel capsule of any one of Embodiments 34-36, wherein the interior of the capsule comprises a release modifier.

Embodiment 38 provides the hollow hydrogel capsule of Embodiment 37, wherein the release modifier comprises an organic acid, mineral acid, caustic material, heat-activated material, oxidizer, enzyme, a nanoparticle, or a combination thereof.

Embodiment 39 provides the hollow hydrogel capsule of any one of Embodiments 34-38, wherein the hollow interior comprises a solvent.

Embodiment 40 provides the hollow hydrogel capsule of any one of Embodiments 34-39, wherein the hollow interior comprises water.

Embodiment 41 provides the hollow hydrogel capsule of any one of Embodiments 34-40, wherein the hollow interior comprises an aqueous solution.

Embodiment 42 provides the hollow hydrogel capsule of any one of Embodiments 34-41, wherein the hydrolytically deprotectable masked primary amine is selected from the group consisting of an acylamine group, a formylamine group, an acetylamine group, a haloacetylamine group, a cyano group, a thioacylamine group, a carbamate group, and a benzoyl group.

Embodiment 43 provides the hollow hydrogel capsule of any one of Embodiments 34-42, wherein the hydrolytically deprotectable masked primary amine is

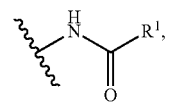

wherein R¹ is independently at each occurrence selected from the group selected from H and (C₁-C₁₀)alkyl.

Embodiment 44 provides the hollow hydrogel capsule of any one of Embodiments 34-43, wherein the vinyl amine comprising the masked primary amine has one vinyl group and one masked primary amine.

Embodiment 45 provides the hollow hydrogel capsule of Embodiment 44, wherein the vinyl amine is linked to the masked primary amine via a linking group.

Embodiment 46 provides the hollow hydrogel capsule of any one of Embodiments 34-45, wherein the vinyl amine comprising the masked primary amine has the following structure

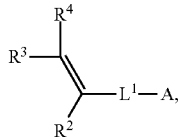

wherein each of R², R³, and R⁴ independently at each occurrence is selected from the group consisting of hydrogen, F, Cl, Br, I, CN, CF₃, OCF₃, (C₁-C₁₀)alkoxy, and (C₁-C₁₀)alkyl; wherein L¹ is selected from the group consisting of a bond, O, S, C(O), S(O), methylenedioxy, ethylenedioxy, NR, SR₂, SO₂R, SO₂NR, SO₃, C(O)C(O), C(O)CH₂C(O), C(S), C(O)O, OC(O), OC(O)O, C(O)NR, OC(O)NR, C(S)NR, (CH₂)₀₋₂NHC(O), N(R)N(R)C(O), N(R)N(R)C(O)O, N(R)N(R)C(O)NR, N(R)SO₂, N(R)SO₂NR, N(R)C(O)O, N(R)C(O), N(R)C(S), N(R)C(O)NR, N(R)C(S)NR, N(C(O)R)C(O), N(OR), C(=NH)NR, C(O)N(OR), C(=NOR), (C₁-C₃₀)alkylene, (C₂-C₃₀)alkenylene, (C₂-C₃₀)alkynylene, (C₁-C₃₀)haloalkylene, (C₁-C₃₀)alkoxylene, (C₁-C₃₀)haloalkoxylene, (C₄-C₃₀)cycloalkyl(C₀-C₃₀)alkylene, (C₁-C₃₀)heterocyclyl(C₀-C₃₀)alkylene, (C₆-C₃₀)aryl(C₀-C₃₀)alkylene, and (C₁-C₃₀)heteroaryl(C₀-C₃₀)alkylene, wherein each alkylene, alkenylene, alkynylene, haloalkylene, alkoxylene, haloalkoxylene, cycloalkylene, arylene, heterocyclylene, and heteroarylene is independently unsubstituted or further substituted with at least one J; wherein J independently at each occurrence is selected from the group consisting of F, Cl, Br, I, OR, CN, CF₃, OCF₃, R, O, S, C(O), S(O), methylenedioxy, ethylenedioxy, N(R)₂, SR, S(O)R, SO₂R, SO₂N(R)₂, SO₃R, C(O)R, C(O)C(O)R, C(O)CH₂C(O)R, C(S)R, C(O)OR, OC(O)R, OC(O)OR, C(O)N(R)₂, OC(O)N(R)₂, C(S)N(R)₂, (CH₂)₀₋₂NHC(O)R, N(R)N(R)C(O)R, N(R)N(R)C(O)OR, N(R)N(R)C(O)N(R)₂, N(R)SO₂R, N(R)SO₂N(R)₂, N(R)C(O)OR, N(R)C(O)R, N(R)C(S)R, N(R)C(O)N(R)₂, N(R)C(S)N(R)₂, N(C(O)R)C(O)R, N(OR)R, C(=NH)N(R)₂, C(O)N(OR)R, and C(=NOR)R, wherein each alkyl, cycloalkyl, cycloalkylalkyl, aryl, aralkyl, heterocyclyl, heterocyclylalkyl, heteroaryl, and heteroarylalkyl is independently unsubstituted or substituted with 1-3 J; wherein R independently at each occurrence is selected from the group consisting of hydrogen, (C₁-C₁₀)alkyl, (C₄-C₁₀)cycloalkyl, (C₄-C₁₀)cycloalkyl(C₁-C₁₀)alkyl, (C₆-C₁₀)aryl, (C₁-C₁₀)aralkyl, (C₁-C₁₀)heterocyclyl, (C₁-C₁₀)heterocyclyl(C₁-C₁₀)alkyl, (C₁-C₁₀)heteroaryl, and (C₁-C₁₀)heteroaryl(C₁-C₁₀)alkyl; and wherein A is the hydrolytically deprotectable masked primary amine.

Embodiment 47 provides the hollow hydrogel capsule of Embodiment 46, wherein R³ and R⁴ are H.

Embodiment 48 provides the hollow hydrogel capsule of any one of Embodiments 46-47, wherein R², R³, and R⁴ are H.

Embodiment 49 provides the hollow hydrogel capsule of any one of Embodiments 46-48, wherein L¹ is selected from the group consisting of O, C(O), NH, C(O)O, OC(O), OC(O)O, C(O)NH, OC(O)NH, NHC(O), NHC(O)NH, (C₁-C₃₀)alkylene, and (C₁-C₃₀)haloalkylene, wherein each alkylene and haloalkylene is independently unsubstituted or further substituted with at least one J.

Embodiment 50 provides the hollow hydrogel capsule of any one of Embodiments 46-49, where L¹ is a covalent bond between the vinyl group and the masked primary amine.

Embodiment 51 provides the hollow hydrogel capsule of any one of Embodiments 34-50, wherein the vinyl amine comprising the masked primary amine is N-vinyl formamide,

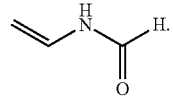

Embodiment 52 provides the hollow hydrogel capsule of any one of Embodiments 34-51, wherein the polyvinyl compound includes hydrolyzable bonds that are at least partially hydrolyzed in the hydrogel shell.

Embodiment 53 provides the hollow hydrogel capsule of any one of Embodiments 34-52, wherein the polyvinyl compound has two vinyl groups.

Embodiment 54 provides the hollow hydrogel capsule of any one of Embodiments 34-53, wherein the polyvinyl compound has the following structure

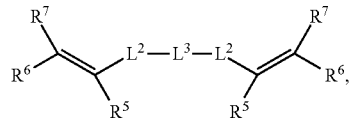

wherein each of R⁵, R⁶, and R⁷ are independently at each occurrence selected from the group consisting of hydrogen, F, Cl, Br, I, CN, CF₃, OCF₃, (C₁-C₁₀)alkoxy, and (C₁-C₁₀)alkyl; wherein L² is independently at each occurrence selected from the group consisting of a bond, O, S, C(O), S(O), methylenedioxy, ethylenedioxy, NR', SR'₂, SO₂R', SO₂NR', SO₃, C(O)C(O), C(O)CH₂C(O), C(S), C(O)O, OC(O), OC(O)O, C(O)NR', OC(O)NR', C(S)NR', (CH₂)₀₋₂NHC(O), N(R')N(R')C(O), N(R')N(R')C(O)O, N(R')N(R')C(O)NR', N(R')SO₂, N(R')SO₂NR', N(R')C(O)O, N(R')C(O), N(R')C(S), N(R')C(O)NR', N(R')C(S)NR', N(C(O)R')C(O), N(OR'), C(=NH)NR', C(O)N(OR'), and C(=NOR'); wherein L³ is independently at each occurrence selected from the group consisting of (C₁-C₃₀)alkylene, (C₁-C₃₀)haloalkylene, (C₀-C₃₀)alkyl(C₄-C₃₀)cycloalkyl(C₀-C₃₀)alkylene, (C₀-C₃₀)alkyl(C₁-C₃₀)heterocyclyl(C₀-C₃₀)alkylene, (C₀-C₃₀)alkyl(C₆-C₃₀)aryl(C₀-C₃₀)alkylene, and (C₀-C₃₀)alkyl(C₁-C₃₀)heteroaryl(C₀-C₃₀)alkylene, wherein each alkylene, haloalkylene, cycloalkylene, arylene, heterocyclylene, and heteroarylene is independently unsubstituted or further substituted with at least one J'; wherein the variable J' independently at each occurrence is selected from the group consisting of F, Cl, Br, I, OR', CN, CF₃, OCF₃, R', O, S, C(O), S(O), methylenedioxy, ethylenedioxy, N(R')₂, SR', S(O)R', SO₂R', SO₂N(R')₂, SO₃R', C(O)R', C(O)C(O)R', C(O)CH₂C(O)R', C(S)R', C(O)OR', OC(O)R', OC(O)OR', C(O)N(R')₂, OC(O)N(R')₂, C(S)N(R')₂, (CH₂)₀₋₂NHC(O)R', N(R')N(R')C(O)R', N(R')N(R')C(O)OR', N(R')N(R')

C(O)N(R')₂, N(R')SO₂R', N(R')SO₂N(R')₂, N(R')C(O)OR', N(R')C(O)R', N(R')C(S)R', N(R')C(O)N(R')₂, N(R')C(S)N(R')₂, N(C(O)R')C(O)R', N(OR')R', C(=NH)N(R')₂, C(O)N(OR')R', and C(=NOR')R'; and wherein R' is independently at each occurrence is selected from the group consisting of hydrogen, $(C_1-C_{10})$alkyl, $(C_4-C_{10})$cycloalkyl, $(C_4-C_{10})$cycloalkyl$(C_1-C_{10})$alkyl, $(C_6-C_{10})$aryl, $(C_1-C_{10})$aralkyl, $(C_1-C_{10})$heterocyclyl, $(C_1-C_{10})$heterocyclyl$(C_1-C_{10})$alkyl, $(C_1-C_{10})$heteroaryl, and $(C_1-C_{10})$heteroaryl$(C_1-C_{10})$alkyl, wherein each alkyl, cycloalkyl, cycloalkylalkyl, aryl, aralkyl, heterocyclyl, heterocyclylalkyl, heteroaryl, and heteroarylalkyl is independently unsubstituted or substituted with 1-3 J'.

Embodiment 55 provides the hollow hydrogel capsule of Embodiment 54, wherein each of $R^6$ and $R^7$ are hydrogen.

Embodiment 56 provides the hollow hydrogel capsule of any one of Embodiments 54-55, wherein each of $R^5$, $R^6$, and $R^7$ are hydrogen.

Embodiment 57 provides the hollow hydrogel capsule of any one of Embodiments 54-56, wherein $L^2$ is independently at each occurrence selected from the group consisting of a bond, O, S, C(O), S(O), methylenedioxy, ethylenedioxy, NH, SH₂, SO₂H, SO₂NH, SO₃, C(O)C(O), C(O)CH₂C(O), C(S), C(O)O, OC(O), OC(O)O, C(O)NH, OC(O)NH, C(S)NH, (CH₂)₀₋₂NHC(O), NHNHC(O), NHNHC(O)O, NHNHC(O)NH, N(R')SO₂, NHSO₂NH, NHC(O)O, NHC(O), NHC(S), NHC(O)NH, NHC(S)NH, N(C(O)H)C(O), N(OH), C(=NH)NH, C(O)N(OH), and C(=NOH).

Embodiment 58 provides the hollow hydrogel capsule of any one of Embodiments 54-57, wherein $L^2$ is independently at each occurrence selected from the group consisting of O, C(O), NH, C(O)O, OC(O), OC(O)O, C(O)NH, OC(O)NH, NHC(O)O, NHC(O), and NHC(O)NH.

Embodiment 59 provides the hollow hydrogel capsule of any one of Embodiments 54-58, wherein $L^2$ is —C(O)NH—, wherein the C(O) group is bound directly to the vinyl group.

Embodiment 60 provides the hollow hydrogel capsule of any one of Embodiments 54-59, wherein $L^3$ is independently at each occurrence selected from the group consisting of $(C_1-C_{10})$alkylene, $(C_1-C_{10})$haloalkylene, $(C_0-C_{10})$alkyl$(C_4-C_{10})$cycloalkyl$(C_0-C_{10})$alkyl, $(C_0-C_{10})$alkyl$(C_1-C_{30})$heterocyclyl$(C_0-C_{10})$alkyl, $(C_0-C_{10})$alkyl$(C_6-C_{30})$aryl$(C_0-C_{10})$alkyl, and $(C_1-C_{30})$heteroaryl$(C_0-C_{30})$alkyl, wherein each alkyl, haloalkyl, cycloalkyl, aryl, heterocyclyl, and heteroaryl is independently unsubstituted or further substituted with at least one J'.

Embodiment 61 provides the hollow hydrogel capsule of any one of Embodiments 54-60, wherein $L^3$ is independently at each occurrence selected from the group consisting of $(C_1-C_{10})$alkylene and $(C_1-C_{10})$haloalkylene.

Embodiment 62 provides the hollow hydrogel capsule of any one of Embodiments 54-61, wherein $L^3$ is —CH₂—.

Embodiment 63 provides the hollow hydrogel capsule of any one of Embodiments 34-62, wherein the polyvinyl molecule is N,N'-methylenebis(acrylamide),

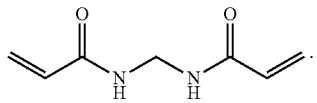

Embodiment 64 provides the hollow hydrogel capsule of any one of Embodiments 34-63, wherein the at least one molecule comprising a plurality of functional groups condensable with primary amines has two functional groups condensable with primary amines.

Embodiment 65 provides the hollow hydrogel capsule of any one of Embodiments 34-64, wherein the at least one molecule comprising a plurality of functional groups condensable with primary amines has the following structure

D-L⁴-D, wherein $L^4$ is independently at each occurrence selected from the group consisting of $(C_1-C_{30})$alkylene, $(C_1-C_{30})$haloalkylene, $(C_0-C_{30})$alkyl$(C_4-C_{30})$cycloalkyl$(C_0-C_{30})$alkylene, $(C_0-C_{30})$alkyl$(C_1-C_{30})$heterocyclyl$(C_0-C_{30})$alkylene, $(C_0-C_{30})$alkyl$(C_6-C_{30})$aryl$(C_0-C_{30})$alkylene, and $(C_0-C_{30})$alkyl$(C_1-C_{30})$heteroaryl$(C_0-C_{30})$alkylene, wherein each alkylene, haloalkylene, cycloalkylene, arylene, heterocyclylene, and heteroarylene is independently unsubstituted or further substituted with at least one J"; wherein D is independently at each occurrence selected from the group consisting of CN, O, S, C(O), S(O), SR", S(O)R", SO₂R", SO₂N(R")₂, SO₃R", C(O)R", C(O)C(O)R", C(O)CH₂C(O)R", C(S)R", C(O)OR", OC(O)R", OC(O)OR", C(O)N(R")₂, OC(O)N(R")₂, C(S)N(R")₂, N(R")C(O)OR", N(R")C(S)R", N(R")C(O)N(R")₂, N(R")C(S)N(R")₂, C(=NH)N(R")₂, C(O)N(OR")R", and C(=NOR"); wherein J" is independently at each occurrence selected from the group consisting of F, Cl, Br, I, OR", CN, CF₃, OCF₃, R", O, S, C(O), S(O), methylenedioxy, ethylenedioxy, N(R")₂, SR", S(O)R", SO₂R", SO₂N(R")₂, SO₃R", C(O)R", C(O)C(O)R", C(O)CH₂C(O)R", C(S)R", C(O)OR", OC(O)R", OC(O)OR", C(O)N(R")₂, OC(O)N(R")₂, C(S)N(R")₂, (CH₂)₀₋₂NHC(O)R", N(R")N(R")C(O)R", N(R")N(R")C(O)OR", N(R")N(R")C(O)N(R")₂, N(R")SO₂R", N(R")SO₂N(R")₂, N(R")C(O)OR", N(R")C(O)R", N(R")C(S)R", N(R")C(O)N(R")₂, N(R")C(S)N(R")₂, N(C(O)R")C(O)R", N(OR")R", C(=NH)N(R")₂, C(O)N(OR")R", and C(=NOR")R"; and wherein R" is independently at each occurrence selected from the group consisting of hydrogen, $(C_1-C_{10})$alkyl, $(C_4-C_{10})$cycloalkyl, $(C_4-C_{10})$cycloalkyl$(C_1-C_{10})$alkyl, $(C_6-C_{10})$aryl, $(C_1-C_{10})$aralkyl, $(C_1-C_{10})$heterocyclyl, $(C_1-C_{10})$heterocyclyl$(C_1-C_{10})$alkyl, $(C_1-C_{10})$heteroaryl, and $(C_1-C_{10})$heteroaryl$(C_1-C_{10})$alkyl, wherein each alkyl, cycloalkyl, cycloalkylalkyl, aryl, aralkyl, heterocyclyl, heterocyclylalkyl, heteroaryl, and heteroarylalkyl is independently unsubstituted or substituted with 1-3 J".

Embodiment 66 provides the hollow hydrogel capsule of Embodiment 65, wherein D is independently at each occurrence selected from the group consisting of O, C(O), S(O)H, SO₂H, SO₃H, C(O)H, C(O)C(O)H, C(O)CH₂C(O)H, C(S)H, C(O)OH, OC(O)H, OC(O)OH, N(R")C(O)OH, N(R")C(S)H, and C(=NOH)H.

Embodiment 67 provides the hollow hydrogel capsule of any one of Embodiments 65-66, wherein D is —C(O)H.

Embodiment 68 provides the hollow hydrogel capsule of any one of Embodiments 65-67, wherein $L^4$ is $(C_1-C_{10})$alkylene independently unsubstituted or further substituted with at least one J".

Embodiment 69 provides the hollow hydrogel capsule of any one of Embodiments 65-68, wherein $L^4$ is propylene, —CH₂—CH₂—CH₂—.

Embodiment 70 provides the hollow hydrogel capsule of any one of Embodiments 34-69, wherein the at least one molecule comprising a plurality of functional groups condensable with primary amines is glutaraldehyde,

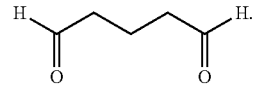

Embodiment 71 provides the hollow hydrogel capsule of any one of Embodiments 34-70, wherein the polymerized composition is a dispersion polymerized composition.

Embodiment 72 provides the hollow hydrogel capsule of any one of Embodiments 34-71, wherein the polymerized composition is a free-radical polymerized composition.

Embodiment 73 provides the hollow hydrogel capsule of any one of Embodiments 34-72, wherein the shell comprises a plurality of primary amine groups.

Embodiment 74 provides the hollow hydrogel capsule of any one of Embodiments 34-73, wherein the diameter of the capsule is about 0.01 μm-100 μm.

Embodiment 75 provides the hollow hydrogel capsule of any one of Embodiments 34-74, wherein the diameter of the capsule is about 0.1 μm-20 μm.

Embodiment 76 provides the hollow hydrogel capsule of any one of Embodiments 34-75, wherein the capsule is substantially spherical.

Embodiment 77 provides the hollow hydrogel capsule of any one of Embodiments 34-76, wherein the shell has a thickness of about 0.001 μm-20 μm.

Embodiment 78 provides the hollow hydrogel capsule of any one of Embodiments 34-77, wherein the shell has a thickness of about 0.01 μm-10 μm.

Embodiment 79 provides the hollow hydrogel capsule of any one of Embodiments 34-78, wherein the shell is porous.

Embodiment 80 provides the hollow hydrogel capsule of Embodiment 79, wherein the shell has a pore size of about 0.0001 nm-100 nm.

Embodiment 81 provides the hollow hydrogel capsule of any one of Embodiments 79-80, wherein the shell has a pore size of about 1 nm-40 nm.

Embodiment 82 provides the hollow hydrogel capsule of any one of Embodiments 34-81, wherein the hydrogel shell comprises metal nanoparticles.

Embodiment 83 provides the hollow hydrogel capsule of Embodiment 82, wherein the metal nanoparticles comprise gold.

Embodiment 84 provides the hollow hydrogel capsule of any one of Embodiments 82-83, wherein the metal nanoparticles are a) within the hydrogel shell, b) on the outer surface of the hydrogel shell, or c) a combination thereof.

Embodiment 85 provides the hollow hydrogel capsule of any one of Embodiments 82-84, wherein the hydrogel shell comprises about 1-100,000 nanoparticles.

Embodiment 86 provides the hollow hydrogel capsule of any one of Embodiments 82-85, wherein the hydrogel shell comprises about 10-10,000 nanoparticles.

Embodiment 87 provides the hollow hydrogel capsule of any one of Embodiments 82-86, wherein the average diameter of the nanoparticles is about 0.01 nm-100 nm.

Embodiment 88 provides the hollow hydrogel capsule of any one of Embodiments 82-87, wherein the diameter of the nanoparticles is about 0.1 nm-50 nm.

Embodiment 89 provides the hollow hydrogel capsule of any one of Embodiments 34-88, further comprising at least one molecule that has at least one of reacted with or formed an electrostatic bond with a primary amine group on the shell, such that the molecule limits the permeability of the hollow hydrogel capsule.

Embodiment 90 provides the hollow hydrogel capsule of Embodiment 89, wherein the at least one molecule that has reacted with or formed an electrostatic bond with the primary amine group on the shell is an organic compound that comprises at least one functional group selected from the group consisting of CN, O, S, C(O), S(O), SR''', S(O)R''', $SO_2R'''$, $SO_2N(R''')_2$, $SO_3R'''$, C(O)R''', C(O)C(O)R''', C(O)$CH_2$C(O)R''', C(S)R''', C(O)OR''', OC(O)R''', OC(O)OR''', C(O)N(R''')$_2$, OC(O)N(R''')$_2$, C(S)N(R''')$_2$, N(R''')C(O)OR''', N(R''')C(S)R''', N(R''')C(O)N(R''')$_2$, N(R''')C(S)N(R''')$_2$, C(=NH)N(R''')$_2$, C(O)N(OR''')R''', and C(=NOR'''); wherein R''' is independently at each occurrence selected from the group consisting of hydrogen, ($C_1$-$C_{10}$)alkyl, ($C_4$-$C_{10}$)cycloalkyl, ($C_4$-$C_{10}$)cycloalkyl($C_1$-$C_{10}$)alkyl, ($C_6$-$C_{10}$)aryl, ($C_1$-$C_{10}$)aralkyl, ($C_1$-$C_{10}$)heterocyclyl, ($C_1$-$C_{10}$)heterocyclyl($C_1$-$C_{10}$)alkyl, ($C_1$-$C_{10}$)heteroaryl, and ($C_1$-$C_{10}$)heteroaryl($C_1$-$C_{10}$)alkyl, wherein each alkyl, cycloalkyl, cycloalkylalkyl, aryl, aralkyl, heterocyclyl, heterocyclylalkyl, heteroaryl, and heteroarylalkyl is independently unsubstituted or substituted with 1-3 J'''; and wherein J''' is independently at each occurrence selected from the group consisting of F, Cl, Br, I, OR''', CN, $CF_3$, $OCF_3$, R''', O, S, C(O), S(O), methylenedioxy, ethylenedioxy, N(R''')$_2$, SR''', S(O)R''', $SO_2R'''$, $SO_2N(R''')_2$, $SO_3R'''$, C(O)R''', C(O)C(O)R''', C(O)$CH_2$C(O)R''', C(S)R''', C(O)OR''', OC(O)R''', OC(O)OR''', C(O)N(R''')$_2$, OC(O)N(R''')$_2$, C(S)N(R''')$_2$, (CH$_2$)$_{0-2}$NHC(O)R''', N(R''')N(R''')C(O)R''', N(R''')N(R''')C(O)OR''', N(R''')N(R''')C(O)N(R''')$_2$, N(R''')$SO_2R'''$, N(R''')$SO_2N(R''')_2$, N(R''')C(O)OR''', N(R''')C(O)R''', N(R''')C(S)R''', N(R''')C(O)N(R''')$_2$, N(R''')C(S)N(R''')$_2$, N(C(O)R''')C(O)R''', N(OR''')R''', C(=NH)N(R''')$_2$, C(O)N(OR''')R''', and C(=NOR''')R'''.

Embodiment 91 provides the hollow hydrogel capsule of Embodiment 90, wherein the at least one molecule that has reacted with or formed an electrostatic bond with the primary amine group on the shell is an organic compound that comprises at least one functional group selected from the group consisting of O, C(O), S(O)H, $SO_2$H, $SO_3$H, C(O)H, C(O)C(O)H, C(O)$CH_2$C(O)H, C(S)H, C(O)OH, OC(O)H, OC(O)OH, N(R')C(O)OH, N(R'')C(S)H, and C(=NOH)H.

Embodiment 92 provides the hollow hydrogel capsule of any one of Embodiments 90-91, wherein the at least one molecule that has reacted with or formed an electrostatic bond with the primary amine group on the shell is a polymeric carboxylic-acid-containing molecule, wherein the reaction with the primary amine group comprises a condensation between a carboxylic acid group on the polymeric carboxylic-acid-containing molecule and the primary amine group.

Embodiment 93 provides the hollow hydrogel capsule of any one of Embodiments 90-92, wherein the organic compound is a ($C_2$-$C_{600,000}$)hydrocarbyl group.

Embodiment 94 provides the hollow hydrogel capsule of any one of Embodiments 89-93, wherein the at least one molecule that has reacted with the primary amine group on the shell is hyaluronic acid.

Embodiment 95 provides the hollow hydrogel capsule of any one of Embodiments 34-94, wherein prior to hydrolysis and crosslinking the polymerized composition comprises particles.

Embodiment 96 provides a hydrogel capsule composition for treatment of a subterranean formation comprising: at least one hollow hydrogel capsule of any one of Embodiments 34-95; a downhole composition for subterranean petroleum or water well drilling, stimulation, clean-up, production, completion, abandonment, or a combination thereof.

Embodiment 97 provides the hydrogel capsule composition of Embodiment 96, wherein the downhole composition for subterranean petroleum or water well drilling, stimulation, clean-up, production, completion, abandonment, or a combination thereof comprises a drilling fluid, stimulation fluid, hacking fluid, spotting fluid, clean-up fluid, production fluid, completion fluid, remedial treatment fluid, abandonment fluid, pill, acidizing fluid, cementing fluid, or a combination thereof.

Embodiment 98 provides a method of making the hollow hydrogel capsule of any one of Embodiments 34-97, comprising: polymerizing the pre-polymerized composition comprising the at least one vinyl amine comprising the hydrolytically deprotectable masked primary amine, and the at least one polyvinyl compound, to give a first polymer; hydrolyzing the first polymer, to deprotect at least some of the masked primary amines, giving a second polymer; cross-linking the second polymer with the at least one molecule comprising the plurality of functional groups condensable with primary amines, to give the hydrogel shell comprising the hydrolyzed and crosslinked polymerized composition.

Embodiment 99 provides the method of Embodiment 98, wherein the method is a template-free method.

Embodiment 100 provides the method of any one of Embodiments 98-99, wherein the hydrolyzing of the first polymer and the cross-linking of the second polymer are carried out in-situ, sequentially, simultaneously, or a combination thereof.

Embodiment 101 provides the method of any one of Embodiments 98-100, further comprising reacting the hydrogel capsule with a permeability modifier, to give a hydrogel capsule with modified permeability of the hydrogel shell.

Embodiment 102 provides the method of Embodiment 101, wherein the permeability of the hydrogel shell is modified after loading at least one cargo into the hollow interior of the hydrogel capsule.

Embodiment 103 provides the method of any one of Embodiments 98-102, further comprising forming metal nanoparticles at least one of one and in the hydrogel shell.

Embodiment 104 provides the method of any one of Embodiments 98-103, further comprising loading at least one cargo into the hollow interior of the hydrogel capsule.

Embodiment 105 provides the method of any one of Embodiments 98-104, further comprising diffusing at least one cargo into the hollow interior of the hydrogel capsule.

Embodiment 106 provides the apparatus or method of any one or any combination of Embodiments 1-105 optionally configured such that all elements or options recited are available to use or select from.

What is claimed is:

1. A method of extending a wellbore through a subterranean formation, the method comprising:
providing a drilling fluid comprising hollow hydrogel capsules wherein the hydrogel capsules comprise:
a hydrogel shell comprising a hydrolyzed and glutaraldehyde-crosslinked polymerized composition, wherein the hydrolyzed and glutaraldehyde-crosslinked polymerized composition is formed with a pre-polymerized composition comprising:
at least one vinyl amine comprising at least one hydrolytically deprotectable masked primary amine comprising N-vinylformamide and at least one polyvinyl compound comprising N,N'-methylenebis(acrylamide);
a hollow interior comprising a viscosity increasing additive and a release modifier agent comprising at least one of an organic acid, a mineral acid, a caustic material, a heat-activated material, an oxidizer, an enzyme, a nanoparticle, or combinations thereof;
wherein the hydrolyzed and glutaraldehyde-crosslinked polymerized composition is crosslinked via at least one molecule comprising a plurality of functional groups condensable with a primary amine and wherein the hydrogel shell is configured to release the viscosity increasing additive at a release pressure;
circulating the drilling fluid though the wellbore while extending the wellbore through the subterranean formation such that a downhole pressure builds in the wellbore, triggering release of at least some of the viscosity increasing additive from the hollow interior of at least some of the hollow hydrogel capsules into the drilling fluid, wherein the triggering occurs downhole and comprises triggering when the downhole pressure is greater than or equal to the release pressure.

2. The method of claim 1, wherein the releasing is localized to one or more specific regions downhole.

3. The method of claim 1, wherein the triggering comprises triggering a gradual release of at least some of the viscosity increasing additive in the hollow interior of at least some of the hollow hydrogel capsules.

4. The method of claim 1, wherein the triggering comprises triggering a fast release of substantially all of the viscosity increasing additive in the hollow interior of at least some of the hollow hydrogel capsules.

5. The method of claim 1, wherein placing the hollow hydrogel capsules in the subterranean formation comprises placing a composition comprising the hydrogel capsules in the subterranean formation.

6. The method of claim 1, wherein the interior of the capsule comprises water, saline, salt, aqueous base, oil, organic solvent, synthetic fluid oil phase, aqueous solution, alcohol or polyol, cellulose, starch, alkalinity control agent, density control agent, density modifier, surfactant, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, rheology modifier, oil-wetting agent, set retarding additive, surfactant, gas, accelerator, weight reducing additive, heavy-weight additive, lost circulation material, filtration control additive, dispersant, salts, fiber, thixotropic additive, breaker, crosslinker, gas, rheology modifier, density control agent, curing accelerator, curing retarder, pH modifier, chelating agent, scale inhibitor, enzyme, resin, water control material, polymer, oxidizer, a marker, or a combination thereof.

7. The method of claim 1, further comprising at least one molecule that has at least one of reacted with or formed an electrostatic bond with a primary amine group on the shell, such that the molecule limits the permeability of the hollow hydrogel capsule.

8. The method of claim 7, wherein the at least one molecule that has reacted with or formed an electrostatic bond with the primary amine group on the shell is an organic compound that comprises at least one functional group selected from the group consisting of O, C(O), S(O)H, $SO_2H$, $SO_3H$, C(O)H, C(O)C(O)H, $C(O)CH_2C(O)H$, C(S)H, C(O)OH, OC(O)H, OC(O)OH, and C(=NOH)H.

* * * * *